(12) United States Patent
Takada

(10) Patent No.: US 7,262,568 B2
(45) Date of Patent: Aug. 28, 2007

(54) BRUSHLESS DC MOTOR COUPLED DIRECTLY TO AC SOURCE AND ELECTRIC APPARATUS USING THE SAME MOTOR

(75) Inventor: Masayuki Takada, Aichi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/568,123

(22) PCT Filed: Jul. 26, 2004

(86) PCT No.: PCT/JP2004/010982

§ 371 (c)(1),
(2), (4) Date: Feb. 14, 2006

(87) PCT Pub. No.: WO2005/036727

PCT Pub. Date: Apr. 21, 2005

(65) Prior Publication Data

US 2006/0208686 A1   Sep. 21, 2006

(30) Foreign Application Priority Data

Oct. 9, 2003  (JP) ............................. 2003-350531
Dec. 10, 2003  (JP) ............................. 2003-411480
Jan. 15, 2004  (JP) ............................. 2004-007696

(51) Int. Cl.
   *H02P 6/06*  (2006.01)
(52) U.S. Cl. ........................ 318/254; 318/459; 318/504

(58) Field of Classification Search ................ 318/138, 318/254, 439, 459, 504, 720–724; 388/928.1
See application file for complete search history.

(56) References Cited

U.S. PATENT DOCUMENTS

| | | | |
|---|---|---|---|
| 4,832,576 A | | 5/1989 | Deguchi et al. |
| 5,694,010 A | * | 12/1997 | Oomura et al. ............. 318/254 |
| 5,731,681 A | * | 3/1998 | Inaniwa et al. ............. 318/729 |
| 6,060,851 A | * | 5/2000 | Imai et al. .................. 318/437 |
| 6,194,856 B1 | | 2/2001 | Kobayashi et al. |
| 6,693,407 B2 | * | 2/2004 | Atmur ........................ 318/811 |
| 2001/0035018 A1 | | 11/2001 | Takagi et al. |

FOREIGN PATENT DOCUMENTS

| | | |
|---|---|---|
| EP | 0 868 017 | 9/1998 |
| JP | 2000-041370 | 2/2000 |
| JP | 2000-069784 | 3/2000 |
| JP | 2002-010609 | 1/2002 |
| JP | 2003-284307 | 10/2003 |

* cited by examiner

*Primary Examiner*—Bentsu Ro
(74) *Attorney, Agent, or Firm*—RatnerPrestia

(57) ABSTRACT

A brushless DC motor is disclosed, in which a commercial AC source is full-wave rectified by a rectifier and then converted into a generally flat and low DC voltage not more than 45V by a DC voltage converter. The low DC voltage is applied in a full-wave driving method to a stator coil via an inverter circuit formed of switching elements in a bridge configuration. This structure allows obtaining the brushless DC motor coupled directly to the AC source, and the torque ripples and uneven rotation of the motor are suppressed.

9 Claims, 23 Drawing Sheets

BRUSHLESS DC MOTOR COUPLED DIRECTLY TO AC SOURCE AND ELECTRIC APPARATUS USING THE SAME MOTOR

This Application is a U.S. National Phase Application of PCT International Application PCT/JP2004/010982 dated Jul. 26, 2004.

TECHNICAL FIELD

The present invention relates to brushless DC motors for driving fans, and it also relates to electric apparatuses using the same motors.

BACKGROUND ART

Recently, a brushless DC motor employing permanent magnets has become widely used for driving a fan of a ventilator. FIG. 23 shows a circuit diagram of a conventional brushless DC motor coupled directly to an AC source to be used for driving a fan. The circuit uses the two-phase half-wave driving method and comprises the following elements:

- rectifier 101 for rectifying the commercial AC power;
- smoothing large capacity aluminum electrolytic capacitor 109;
- two-phase stator coils 103, 104 for driving magnet rotor 105; and
- controller 102 for controlling the power to the stator coils, including switching elements 107, 108 and being mounted on printed circuit board 106. Stator coils 103, 104 are provided with a high voltage DC power source directly from rectifier 101, and controller 102 is provided with a low voltage reduced from the high voltage DC power source. The foregoing brushless DC motor driven by the two-phase half-wave driving method generates rather large noises and vibrations, and needs a smoothing capacitor of large capacity. The present invention aims to provide a brushless DC motor coupled directly to the AC source which overcomes those problems.

DISCLOSURE OF THE INVENTION

The brushless DC motor, coupled directly to the AC source, of the present invention comprises the following elements:

- a stator including a stator coil;
- a rotor including a rotor magnet;
- a magnetic flux sensor for sensing a distribution of magnetic flux density of the rotor magnet;
- an inverter circuit including a plurality of switching elements coupled in a full-wave bridge having an upper arm and a lower arm;
- an AC source coupler;
- a rectifier for full-wave rectifying a voltage of the AC source;
- a DC voltage converter for converting a rectified voltage supplied from the rectifier into a flat low DC voltage, and for applying the flat low DC voltage to the inverter circuit as a power supply: and
- a controller for controlling the inverter circuit based on a signal supplied from the magnetic flux sensor such that the low DC voltage is supplied to the stator coils in a full-wave driving method.

BEST MODE FOR PRACTICING THE INVENTION

Exemplary embodiments of the present invention are demonstrated hereinafter with reference to the accompanying drawings.

EXEMPLARY EMBODIMENT 1

Figure 1:
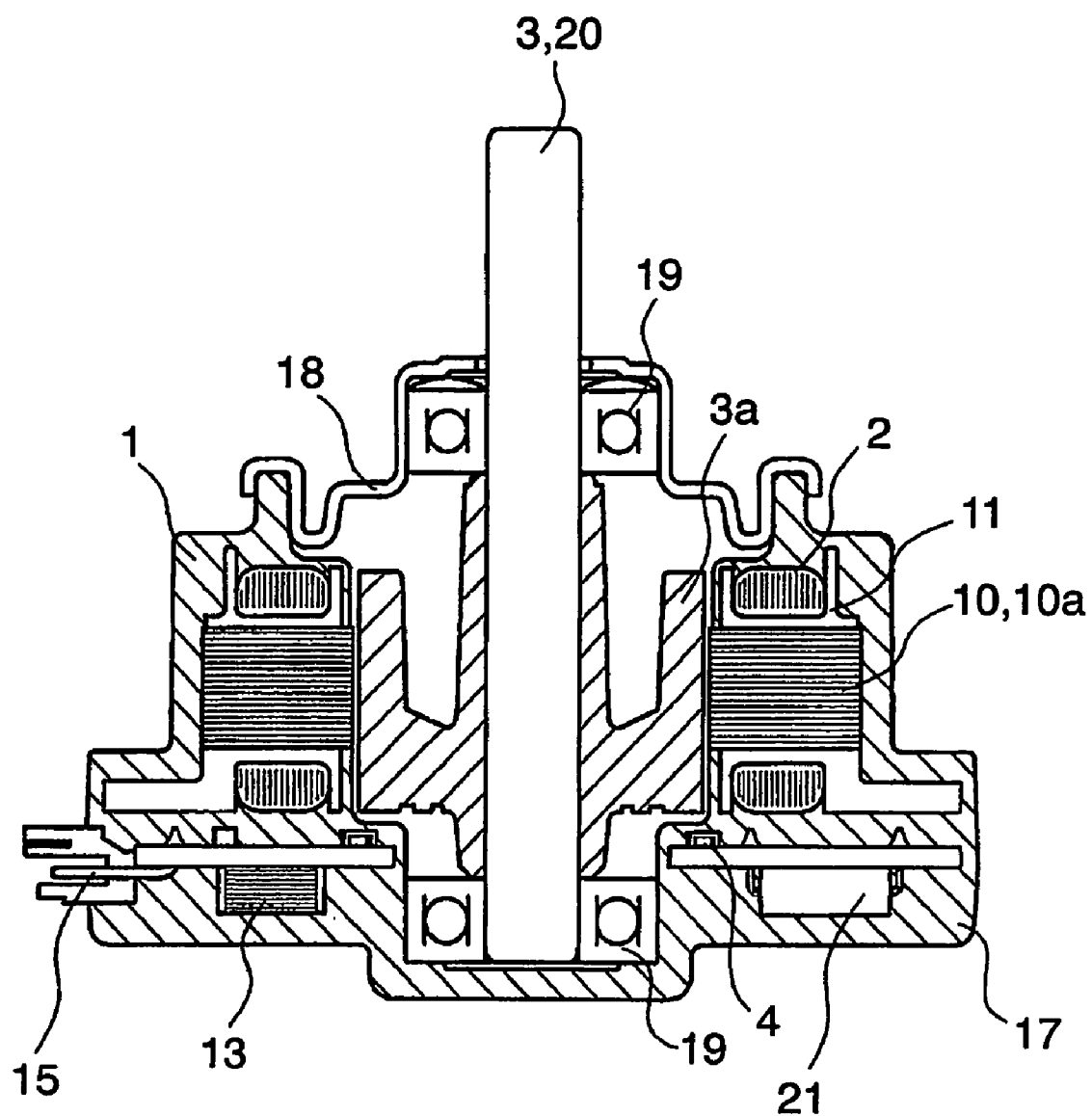
FIG. 1 shows a sectional view of a brushless DC motor in accordance with a first exemplary embodiment of the present invention.

FIG. 1 shows a sectional view of brushless DC motor 1 in accordance with the first exemplary embodiment. Stator 10 is molded of thermosetting resin 17 such as unsaturated polyester. Stator iron core 10a having plural slots is wound with stator coils 2 via insulated material 11. Bracket 18 holds bearing 19, and magnet rotor 3 rotatably faces stator 10.

Magnet rotor 3 is injection-molded of plastic magnet in one body with shaft 20 and provided with the polarity orientation when it is molded. Rotor magnetic pole 3a is thus pole-anisotropic magnet.

Hall element 4 is used as a magnetic flux sensor which senses a distribution of magnetic flux density of the rotor magnetic pole 3a. A space between hall element 4 and rotor magnetic pole 3a is set such that the waveform of the distribution of the magnetic flux density sensed by hall element 4 becomes a similar figure to the waveform of a voltage induced in stator coil 2 by rotor magnetic pole 3a.

Figure 2:
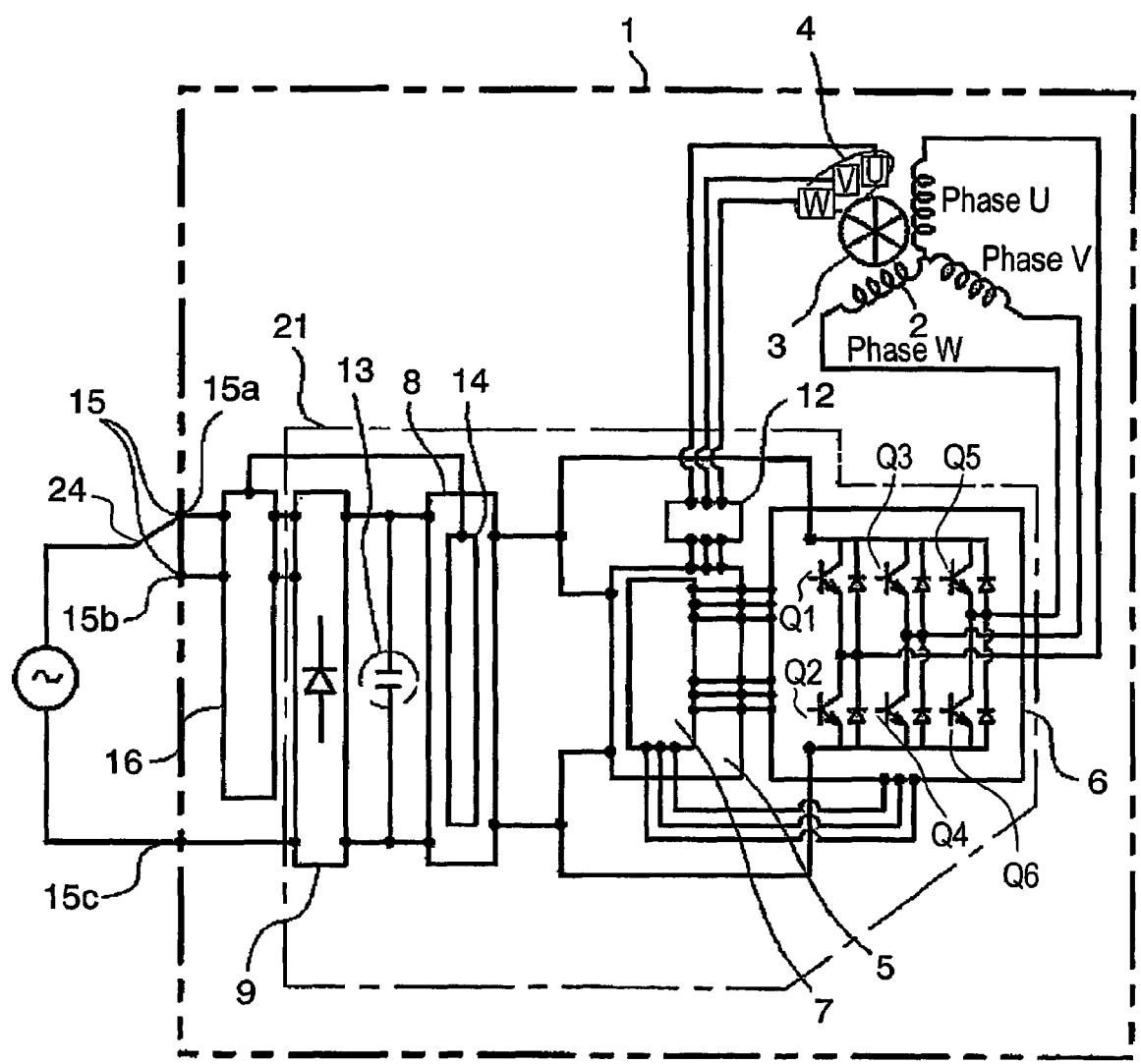
FIG. 2 shows an electric circuit of the brushless DC motor shown in FIG. 1.

FIG. 2 shows the electric circuit of the brushless DC motor of the present embodiment. The commercial AC source is coupled to AC source coupler 15, which has two terminals, namely, strong output terminal 15a and weak output terminal 15b, for obtaining rpm vs. torque characteristics in two steps. More terminals will produce more steps of the characteristics. Terminal 15c is used as a common terminal. Outer switch 24 selects one of terminal 15a or terminal 15b.

Rectifier 9 provides the commercial AC source with full wave rectification. DC voltage converter 8 formed of step-down chopper circuits reduces a full-wave rectified high voltage supplied from rectifier 9 to a low DC voltage of not more than 45V and outputs the low DC voltage. This low DC voltage is applied to inverter circuit 6 as a power supply.

Figure 3:
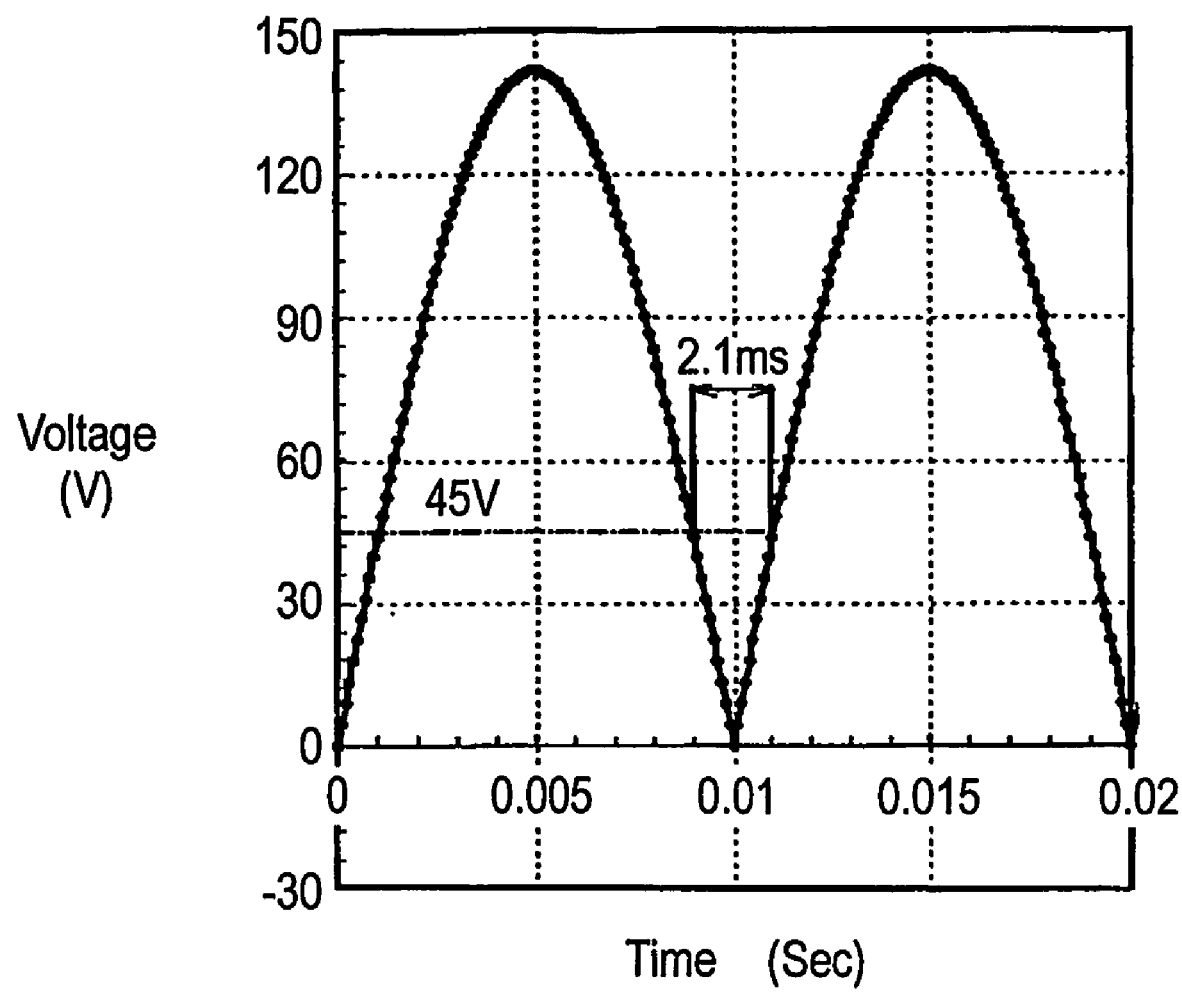
FIG. 3 shows an output voltage waveform of a rectifier of the brushless DC motor shown in FIG. 1.

Smoothing capacitor 13 formed of polymer capacitor and having a small capacity is placed between rectifier 9 and DC voltage converter 8, so that capacitor 13 complements a voltage in a rather short period, e.g. approx. 2.1 mil. sec, where AC 100V 50 Hz rectified in full-wave decreases to not more than 45V (Refer to FIG. 3).

Connection sensor 16 senses which terminals 15a or 15b is selected by switch 24. In the case of selecting weak output terminal 15b, DC voltage changer 14 reduces the low DC voltage supplied from converter 8 lower than the one in the case of selecting strong output terminal 15a. In FIG. 2, the circuit surrounded by alternate long and short dash lines is formed into one-chip IC 21 except the smoothing capacitor and coils and being mounted on an aluminum substrate.

Magnetic flux density synthesizer 12 deducts phase-V waveform from phase-U waveform of hall element 4 in order to remove harmonics of phase-U current of the motor. Synthesizer 12 also deducts phase-W waveform from phase-V waveform of hall element in order to remove the harmonics of phase-V current of the motor. Synthesizer 12 deducts phase-u waveform from phase-W waveform of hall element 4 in order to remove the harmonics of phase-w current of the motor.

Switching elements Q1, Q3, Q5 disposed in the upper arm and switching elements Q2, Q4, Q6 disposed in the lower arm are coupled together in a full-wave bridge, thereby forming inverter circuit 6.

Controller 5 controls inverter circuit 6 based on signals supplied from hall elements 4 such that stator coils 2 can be full-wave driven along a given direction and in a given sequence.

Current waveform controller 7 adjusts an output bias current so as to shape a waveform of the motor current into a similar figure with the waveform from which the harmonics have been removed by synthesizer 12 while providing switching elements Q1-Q6 with feedback in order to keep the switching elements in an unsaturated state yet close to a saturated state.

In the brushless DC motor of the present invention, DC voltage converter 8 converts a high voltage undergone the full-wave rectification into a predetermined low DC voltage not more than 45V and supplies this low DC voltage to stator coil 2. A voltage fluctuation in the AC source thus does not change the characteristics of the motor. The motor is powered by full-wave driving of the inverter circuit 6 at a generally flat low DC voltage, and yet, harmonics of the motor current are removed, so that the motor produces fewer noises and vibrations. As shown in FIG. 3, smoothing capacitor 13 can have a small capacity just enough for complementing the voltage in a rather short period, e.g. approx. 2.1 mil. sec. where the voltage becomes insufficient. Smoothing capacitor 13 thus can employ a smaller capacitor, e.g. a solid-state capacitor featuring a longer life and fewer changes in the characteristics due to ambient temperatures. The solid-state capacitor includes a polymer capacitor, ceramic capacitor, and film capacitor.

Figure 4:
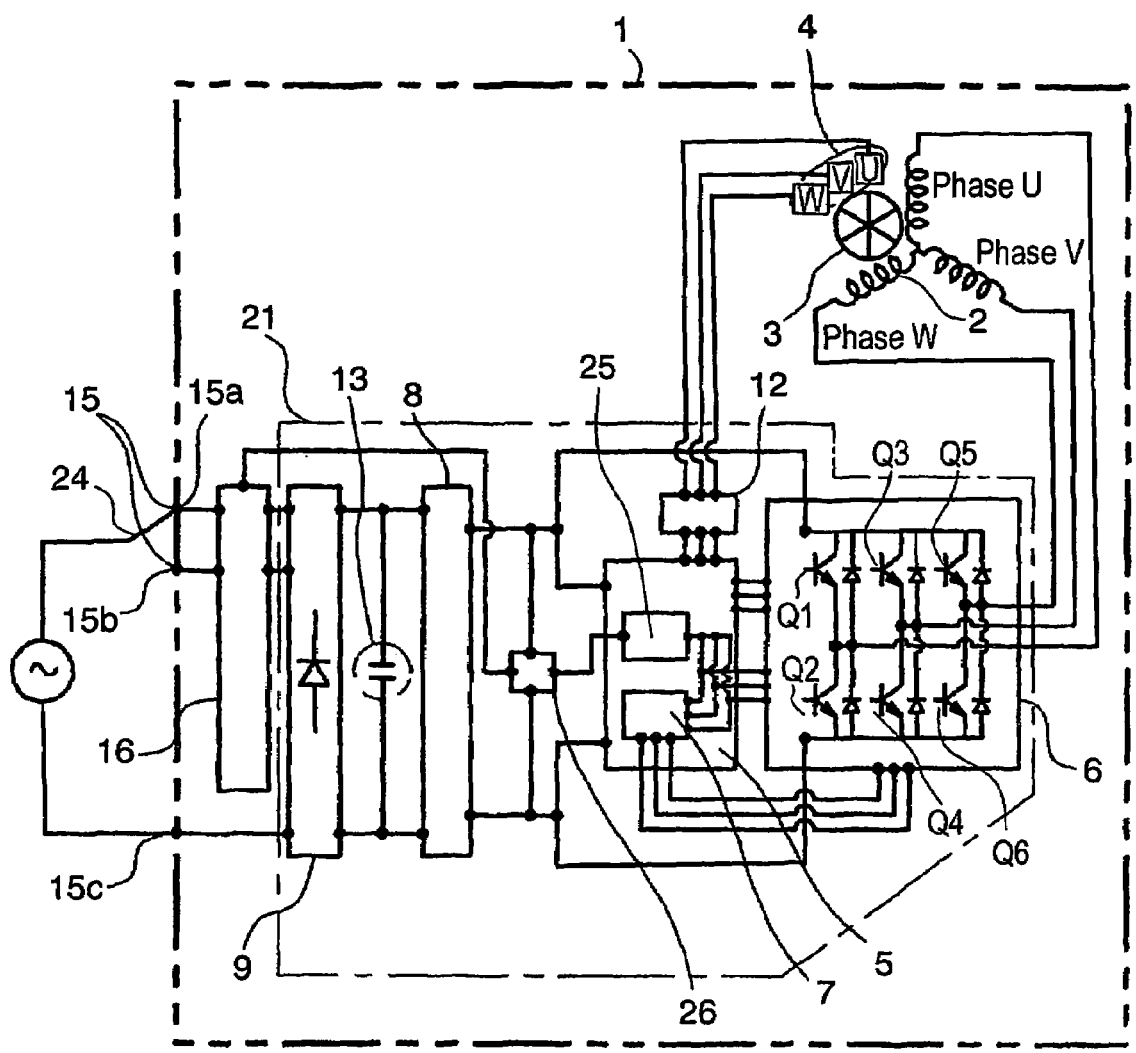
FIG. 4 shows an electric circuit, using a PWM method, of the brushless DC motor shown in FIG. 1.

As shown in FIG. 4, the pulse width modulation (PWM) control is applicable to the brushless DC motor of the present embodiment. PWM controller 25 controls switching elements Q2, Q4, and Q6 of the lower arm in PWM method, and also controls inverter circuit 6 based on signals supplied form hall element 4 such that power is supplied in full-wave driving to stator coils 2 in a given direction and sequence. Current waveform controller 7 adjusts an ON/OFF duty of the switching elements disposed in the lower arm for controlling the waveform. Switching elements Q1, Q3, and Q5 of the upper arm can be PWM-controlled instead of the switching elements of the lower arm. As a result, the number of steps for adjusting the specification of the apparatus can be reduced.

Duty instruction means 26 gives an instruction for the ON/OFF duty of PWM with a voltage reduced from the low DC voltage.

Coupling sensor 16 senses which terminal 15a or 15b of AC source coupler 15 is selected by switch 24. When weak output terminal 15b is selected, duty instruction means 26 shortens an ON duty of PWM so that an average voltage applied to stator coils 2 becomes lower than that when strong output terminal 15a is selected.

EXEMPLARY EMBODIMENT 2

Figure 5:
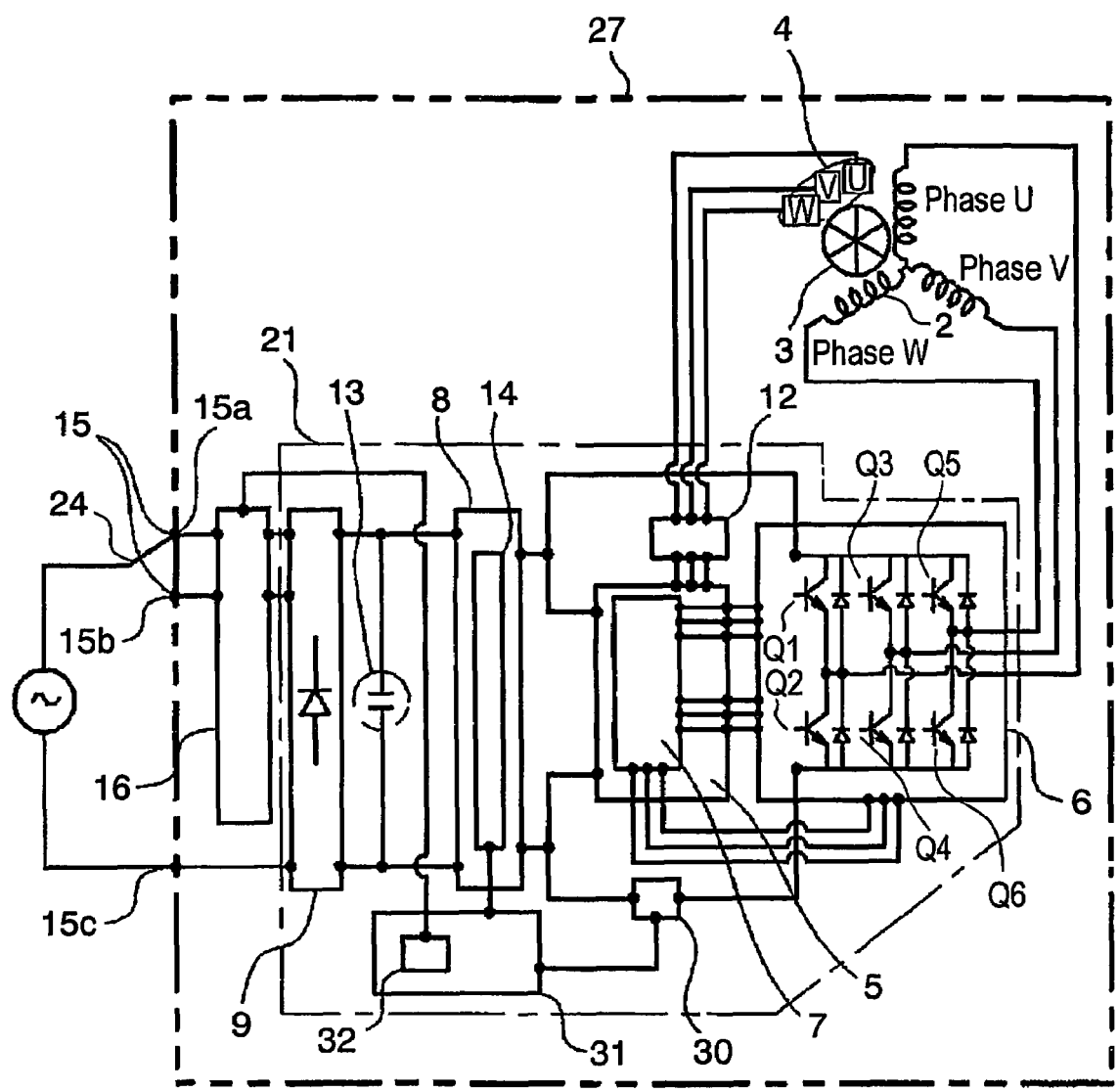
FIG. 5 shows an electric circuit of a brushless DC motor in accordance with a second exemplary embodiment of the present invention.

FIG. 5 shows an electric circuit of the brushless DC motor in accordance with the second exemplary embodiment of the present invention. Elements similar to those in the previous embodiment have the same reference marks and the descriptions thereof are omitted here.

Current sensor 30 senses a current of inverter circuit 6. Current controller 31 adjusts the low DC voltage supplied from DC voltage converter 8 such that an average current of inverter circuit 6 becomes equal to the set current. An upper limit voltage is set to the low DC voltage to be applied to inverter circuit 6 because a withstanding voltage and a kick-back voltage of the switching elements should be taken into consideration.

Coupling sensor 16 senses which terminal 15a or 15b of AC source coupler 15 is selected by switch 24. When weak output terminal 15b is selected, coupling sensor 16 instructs set-current changer 32 to lower the set current of inverter circuit 6 than that of when strong output terminal 15*a* is selected.

Figure 6:
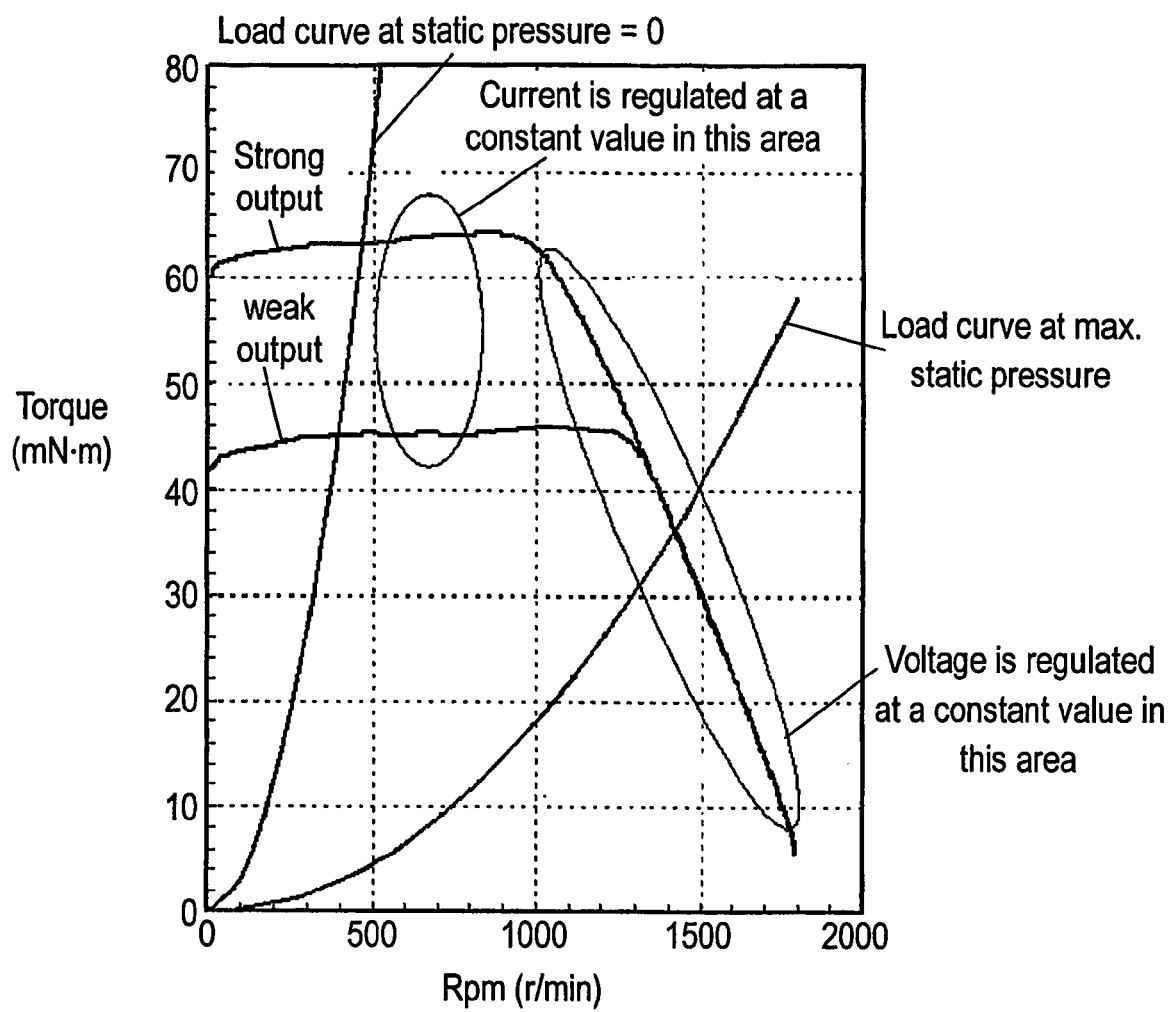
FIG. 6 shows the characteristics of rpm—torque of the brushless DC motor shown in FIG. 5.

In the brushless DC motor of the present embodiment, the average current of inverter circuit 6 is kept constant, so that output torque is generally kept constant as shown in FIG. 6. Since a difference in rpm with respect to a change in load is thus great, the ventilator employing the brushless DC motor of the present embodiment has the characteristics of air volume vs. static pressure similar to that of the ventilator employing an induction motor. The foregoing structure thus allows preventing an extreme low static pressure or an extreme large air volume at 0 (zero) static pressure, and also obtaining a ventilator of low noise and low power consumption.

Figure 7:
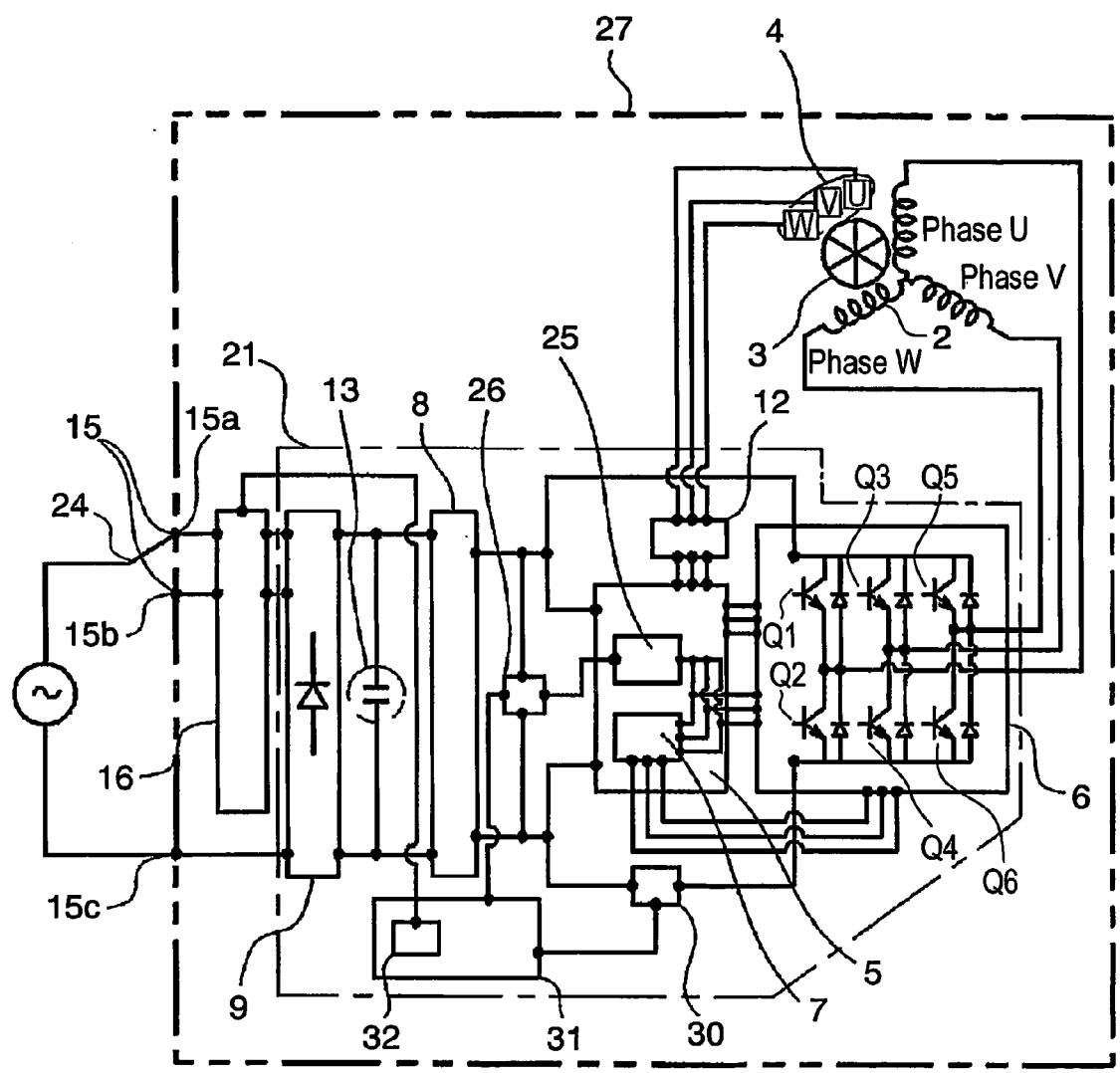
FIG. 7 shows an electric circuit, using the PWM method, of the brushless DC motor shown in FIG. 5.

FIG. 7 tells that the PWM control is applicable to the brushless DC motor of the present embodiment as described in the previous embodiment. Current controller 31 controls duty instruction means 26 for adjusting an ON/OFF duty of the PWM such that the average current of inverter circuit 6 becomes equal to the set current. In other words, the low DC voltage supplied from DC voltage converter 8 is adjusted.

EXEMPLARY EMBODIMENT 3

Figure 8:
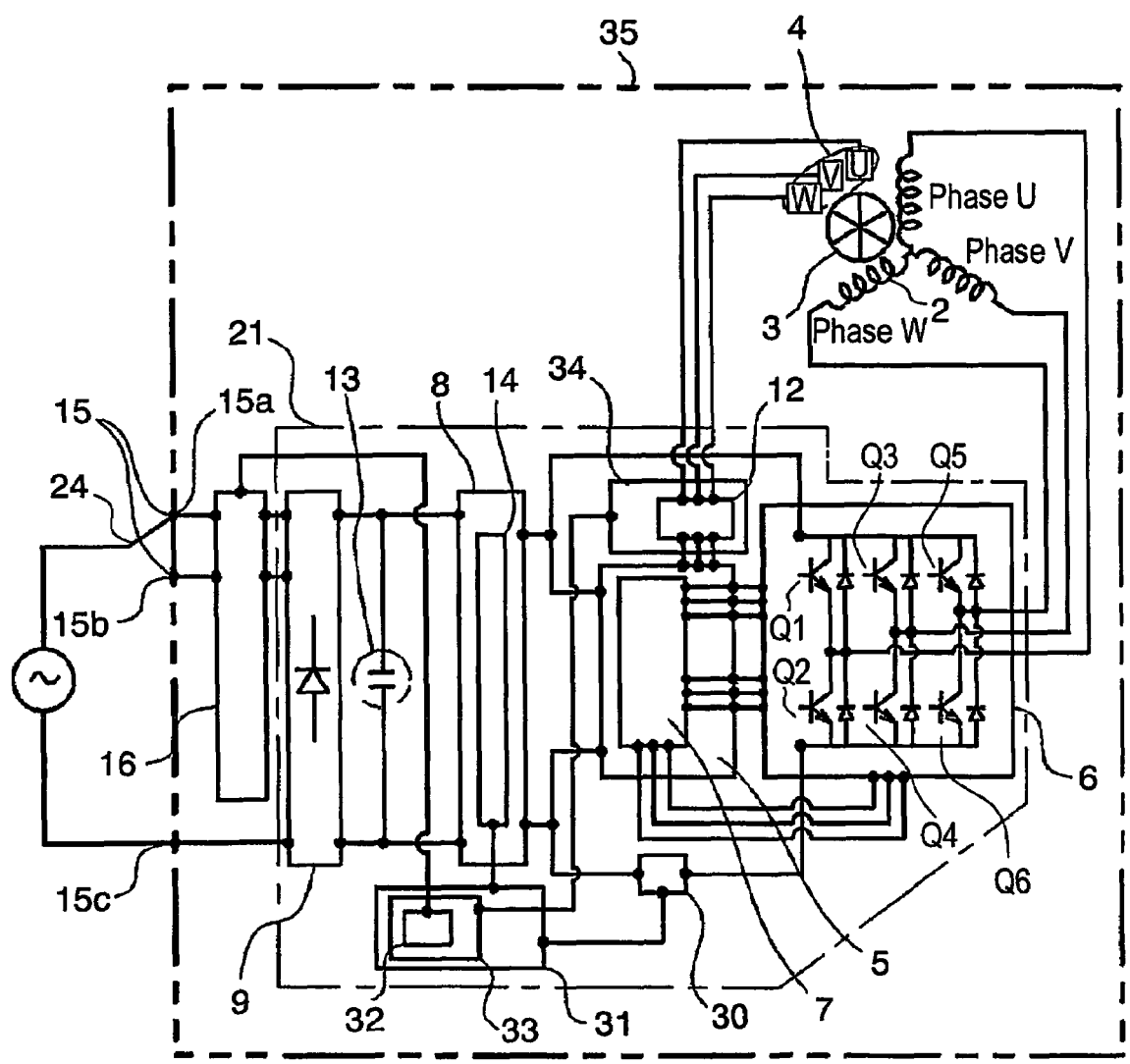
FIG. 8 shows an electric circuit of a brushless DC motor in accordance with a third exemplary embodiment of the present invention.

FIG. 8 shows an electric circuit of the brushless DC motor in accordance with the third exemplary embodiment of the present invention. Elements similar to those in the previous embodiment have the same reference marks and the descriptions thereof are omitted here.

Rotary signal output means 34 outputs pulses indicating an rpm of the motor from the waveform sensed by magnetic flux sensor 4. Current instructing means 33 converts this pulse waveform from frequency to voltage and obtains a voltage, namely, an rpm of the motor. In response to the rpm of the motor, current instructing means 33 instructs inverter circuit 6 to increase a current with reference to the set value. In other words, current instructing means 33 gives an instruction to circuit 6 to increase the current at the greater rpm.

Current controller 31 adjusts the low DC voltage supplied from DC voltage converter 8 such that an average current of inverter circuit 6 becomes equal to the current designated by current instructing means 33. An upper limit voltage is set to the low DC voltage to be applied to inverter circuit 6 because a withstanding voltage and a kick-back voltage of the switching elements should be taken into consideration. As a result, within a certain period, the motor can operate at a constant voltage without controlling the current even the rpm rises.

Coupling sensor 16 senses which terminal 15*a* or 15*b* of AC source coupler 15 is selected by switch 24. When weak output terminal 15*b* is selected, coupling sensor 16 instructs set-current changer 32 to lower the set current of inverter circuit 6 than that of when strong output terminal 15*a* is selected.

Figure 9:
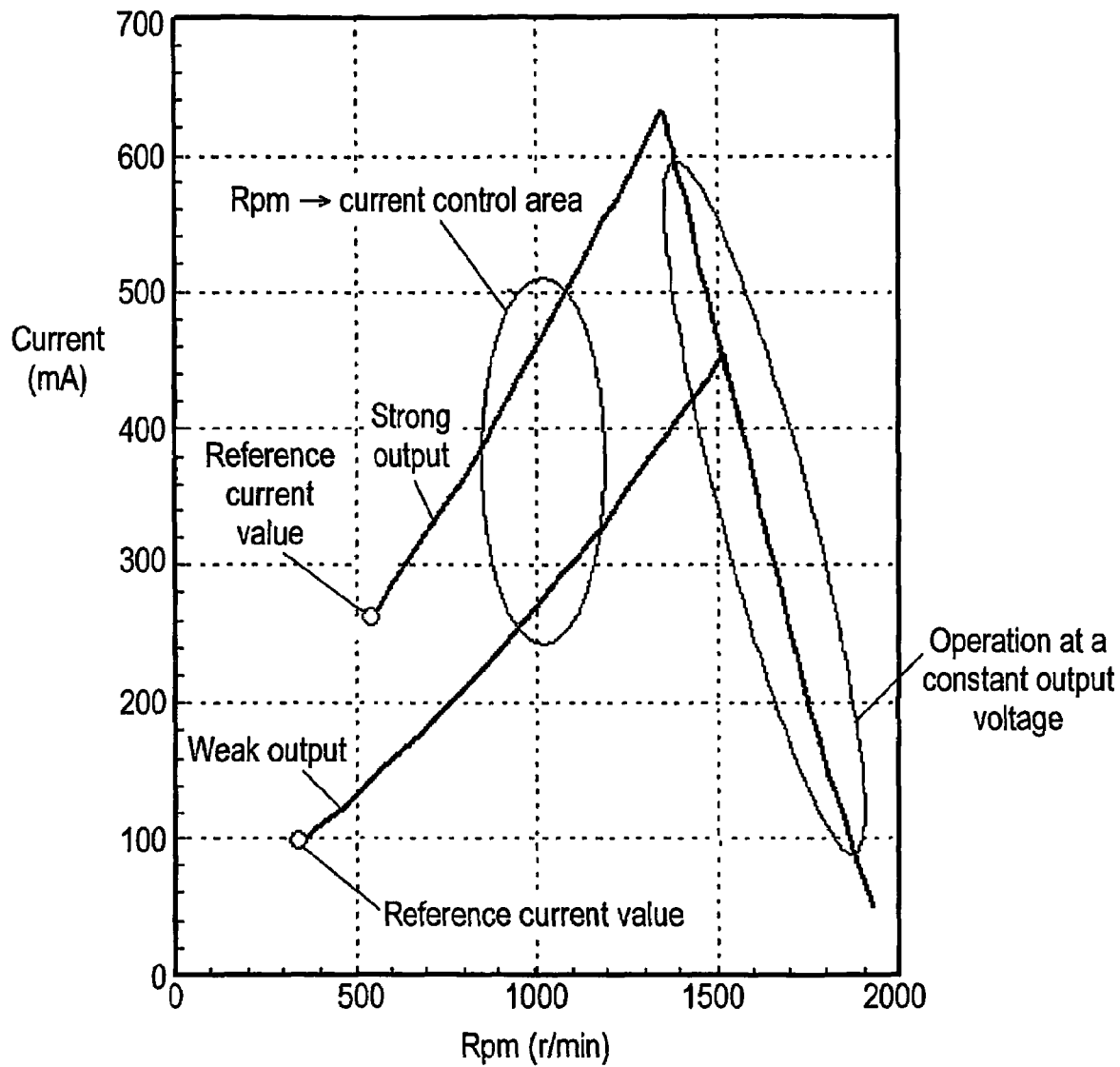
FIG. 9 shows the characteristics of rpm—current of the brushless DC motor shown in FIG. 8.
Figure 10:
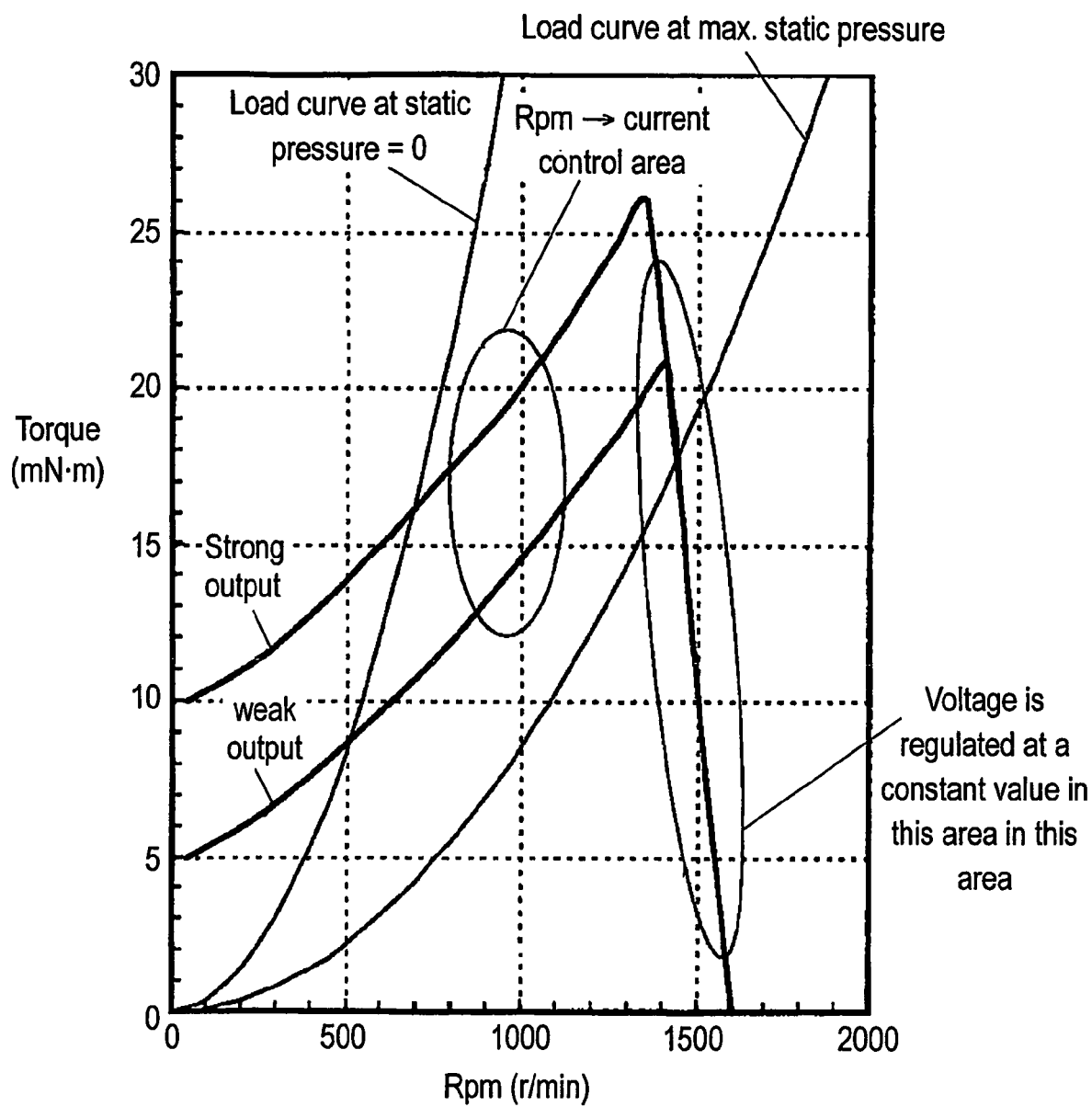
FIG. 10 shows the characteristics of rpm—torque of the brushless DC motor shown in FIG. 8.

In the brushless DC motor of the present embodiment, an increment of the rpm increases the current of inverter circuit 6 as shown in FIG. 9, and the torque increases as shown in FIG. 10. In other words, current instructing means 33 increases the current of inverter circuit 6 in response to an increment of the rpm of the motor so that the torque curve can get a desirable gradient.

Figure 11:
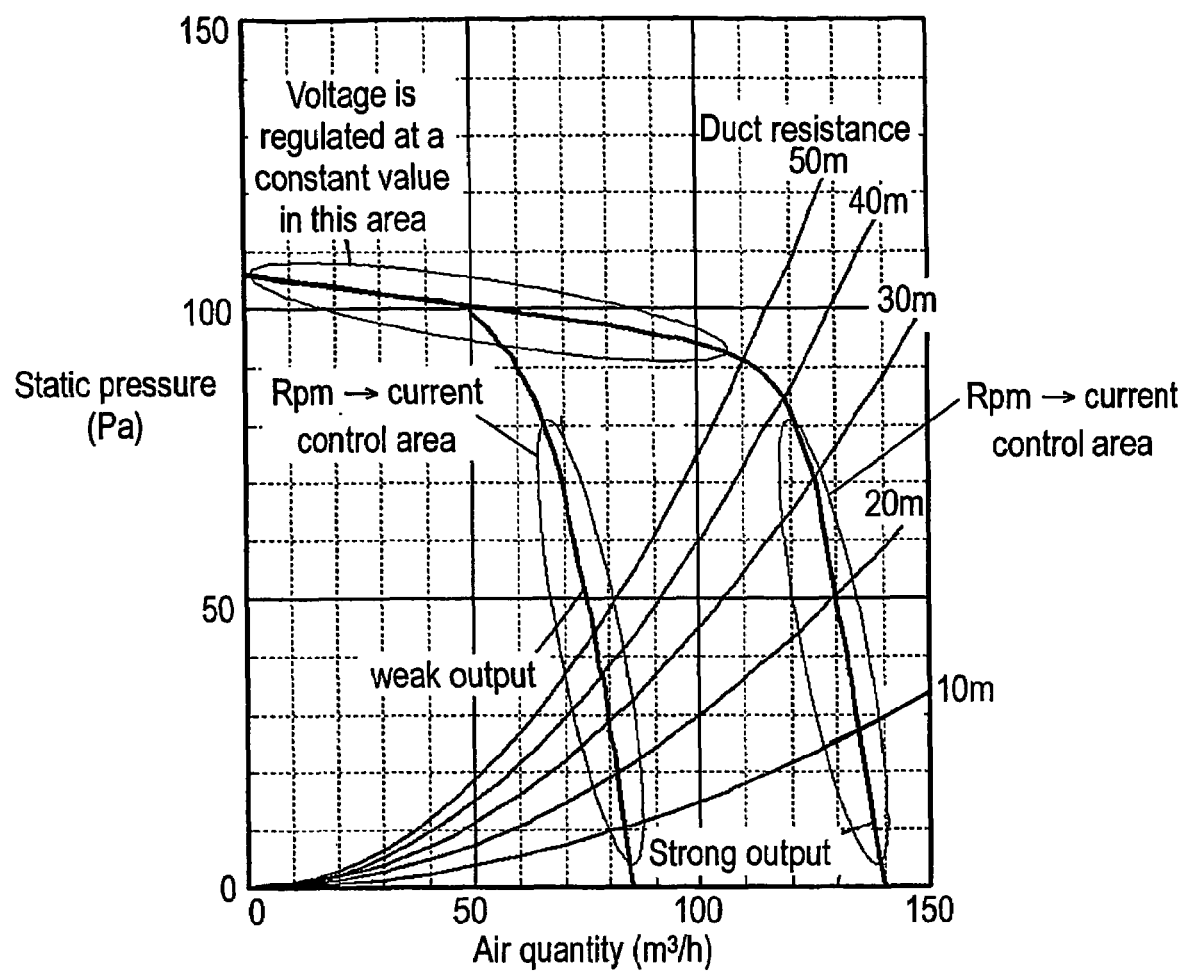
FIG. 11 shows the characteristics of air volume—static pressure of a ventilator using the brushless DC motor shown in FIG. 8.

The ventilator employing the brushless DC motor of the present embodiment can thus obtain the characteristics of air volume vs. static pressure, as shown in FIG. 11. The characteristics get the air volume changes only extremely few even if a pressure loss changes by the outer wind pressure or by the difference of the duct length.

Figure 12:
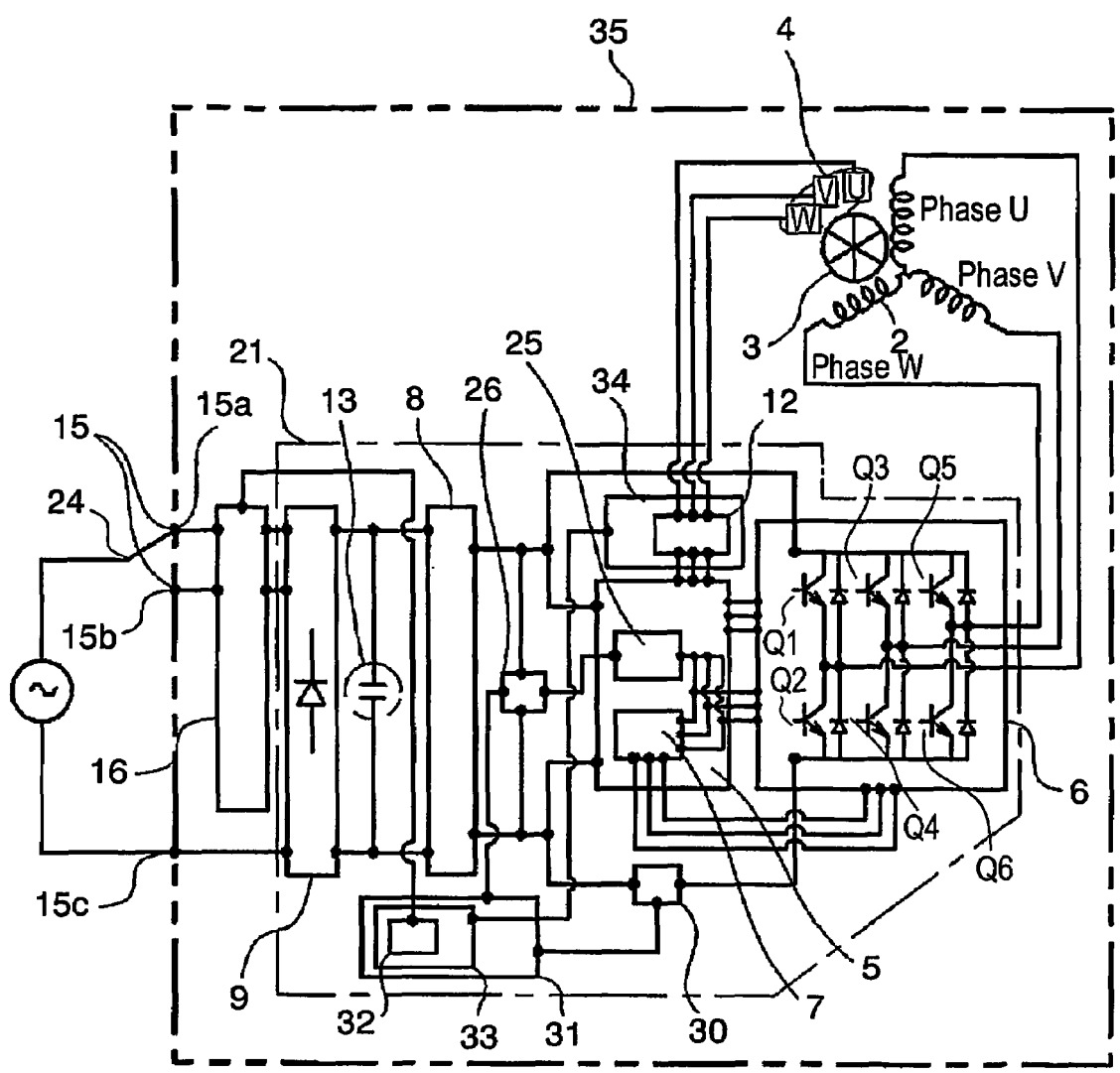
FIG. 12 shows an electric circuit, using the PWM method, of the brushless DC motor shown in FIG. 8.

FIG. 12 tells that the PWM control is applicable to the brushless DC motor of the present embodiment as described in the previous embodiment. Current controller 31 controls duty instruction means 26, thereby adjusting the ON/OFF duty of the PWM such that the average current of inverter circuit 6 becomes equal to the current instructed by current instructing means 33 to change in response to the rpm of the motor.

An upper limit of the current of inverter circuit 6 is set considering the allowable power consumption of inverter circuit 6. The ON duty of PWM is set 100% at the upper limit so that a rise of the rpm will not accompany an increment of the current, and the motor operates at ON duty of 100% in a certain period.

EXEMPLARY EMBODIMENT 4

Figure 13:
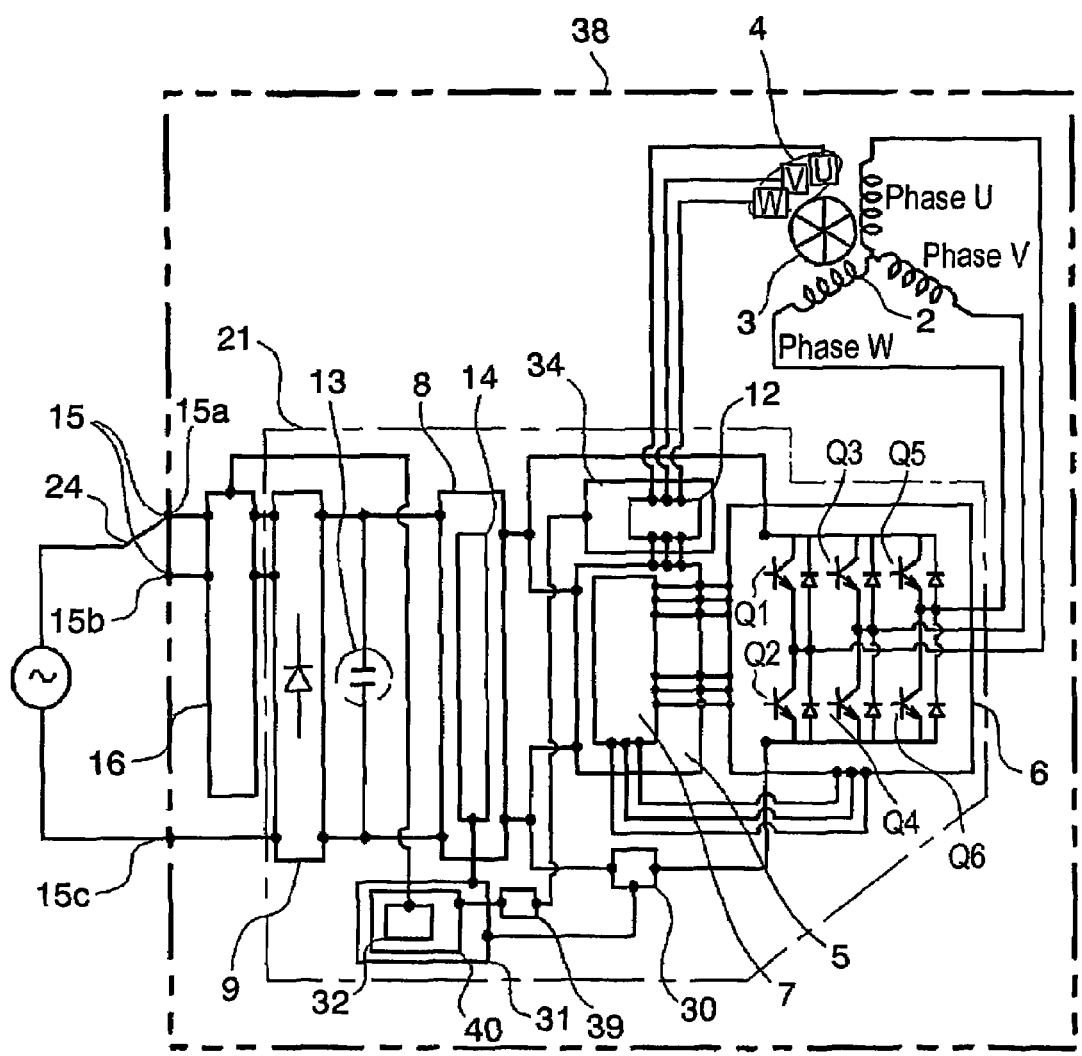
FIG. 13 shows an electric circuit of a brushless DC motor in accordance with a fourth exemplary embodiment of the present invention.

FIG. 13 shows an electric circuit of the brushless DC motor in accordance with the fourth exemplary embodiment of the present invention. Elements similar to those in the previous embodiment have the same reference marks and the descriptions thereof are omitted here.

Rotary signal output means 34 outputs pulses indicating an rpm of the motor from the waveform sensed by magnetic flux sensor 4. Rpm range sensor 39 converts this pulse waveform from frequency to voltage and obtains an rpm range including the rpm of the motor at that time (Refer to FIG. 14).

Current instructing means 40 instructs inverter circuit 6 to change the current in response to the rpm range. To be more specific, current instructing means 40 gives an instruction to inverter circuit 6 such that a greater rpm accompanies an increment of the current step by step corresponding to each one of the rpm ranges.

Current sensor 30 senses a current of inverter circuit 6. Current controller 31 adjusts the low DC voltage supplied from DC voltage converter 8 such that an average current of inverter circuit 6 becomes equal to the current designated by current instructing means 40. An upper limit voltage is set to the low DC voltage to be applied to inverter circuit 6 because a withstanding voltage and a kick-back voltage of switching elements Q1-Q6 should be taken into consideration. As a result, within a certain period, the motor can operate at a constant voltage without controlling the current even if the rpm rises.

Coupling sensor 16 senses which terminal 15*a* or 15*b* of AC source coupler 15 is selected by switch 24. When weak output terminal 15*b* is selected, coupling sensor 16 instructs set-current changer 32 to lower the set current of inverter circuit 16 than that of when strong output terminal 15*a* is selected.

Figure 14:
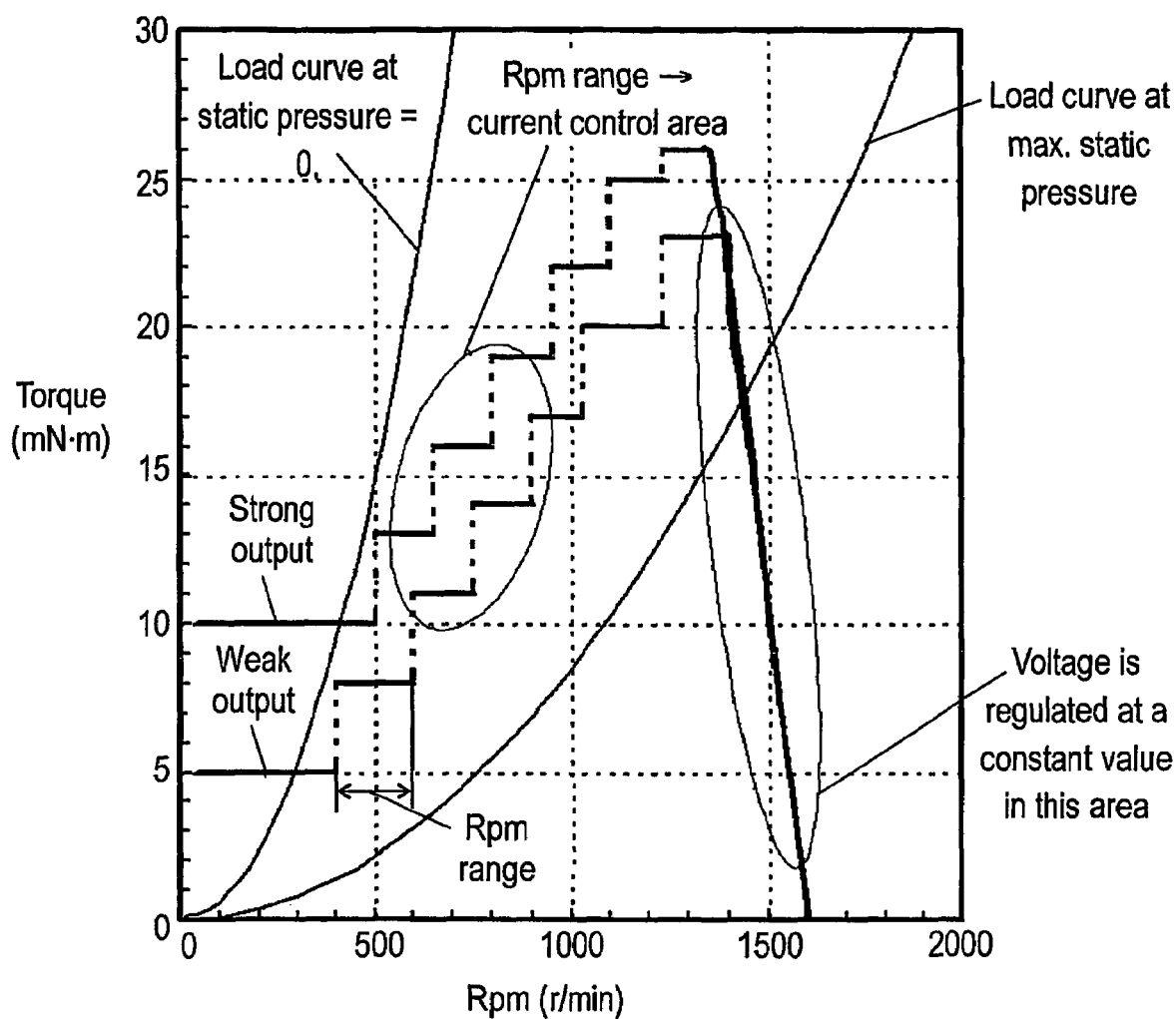
FIG. 14 shows the characteristics of rpm—torque of the brushless DC motor shown in FIG. 13.

As shown in FIG. 14, in the brushless DC motor of the present embodiment, the torque increases step by step at the greater rpm of the motor. In other words, current instructing means 40 increases the current of inverter circuit 6 step by step in response to an increment of the rpm of the motor so that the torque curve can get a desirable gradient. At the broken lines of torque characteristics shown in FIG. 14, hysteresis between fall and rise of the rpm is set, and a width of the hysteresis is set appropriately not to invite inconvenience, e.g. hunting. The stepwise change of the current permits a frequency-voltage converter having a smaller dynamic range to be usable.

Figure 15:
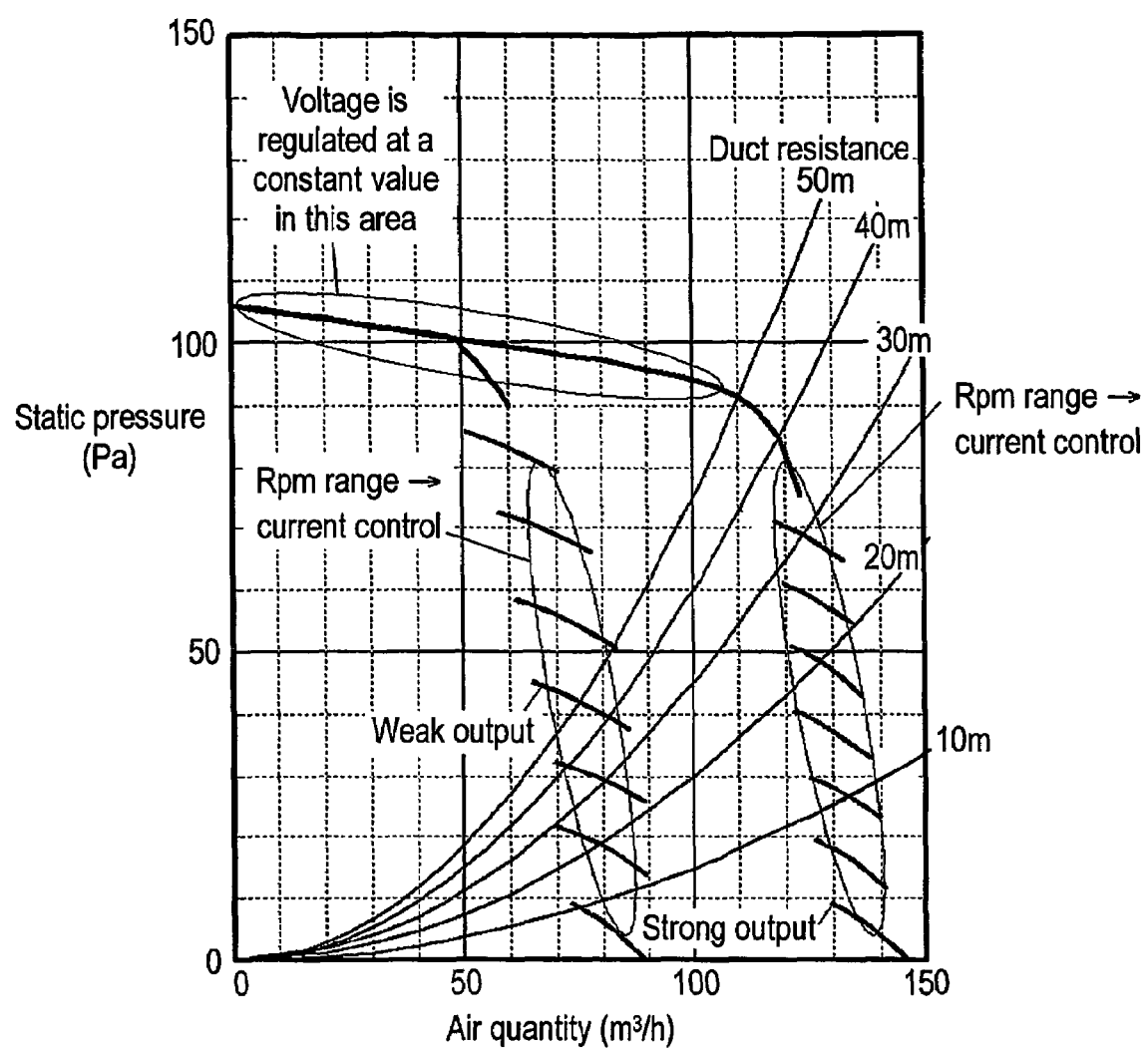
FIG. 15 shows the characteristics of air volume—static pressure of a ventilator using the brushless DC motor shown in FIG. 13.

The ventilator employing the brushless DC motor of the present embodiment has the characteristics of air volume vs.

static pressure, as shown in FIG. 15. The characteristics get the air volume changes only extremely few even if a pressure loss changes by the outer wind pressure or by the difference of the duct length.

Figure 16:
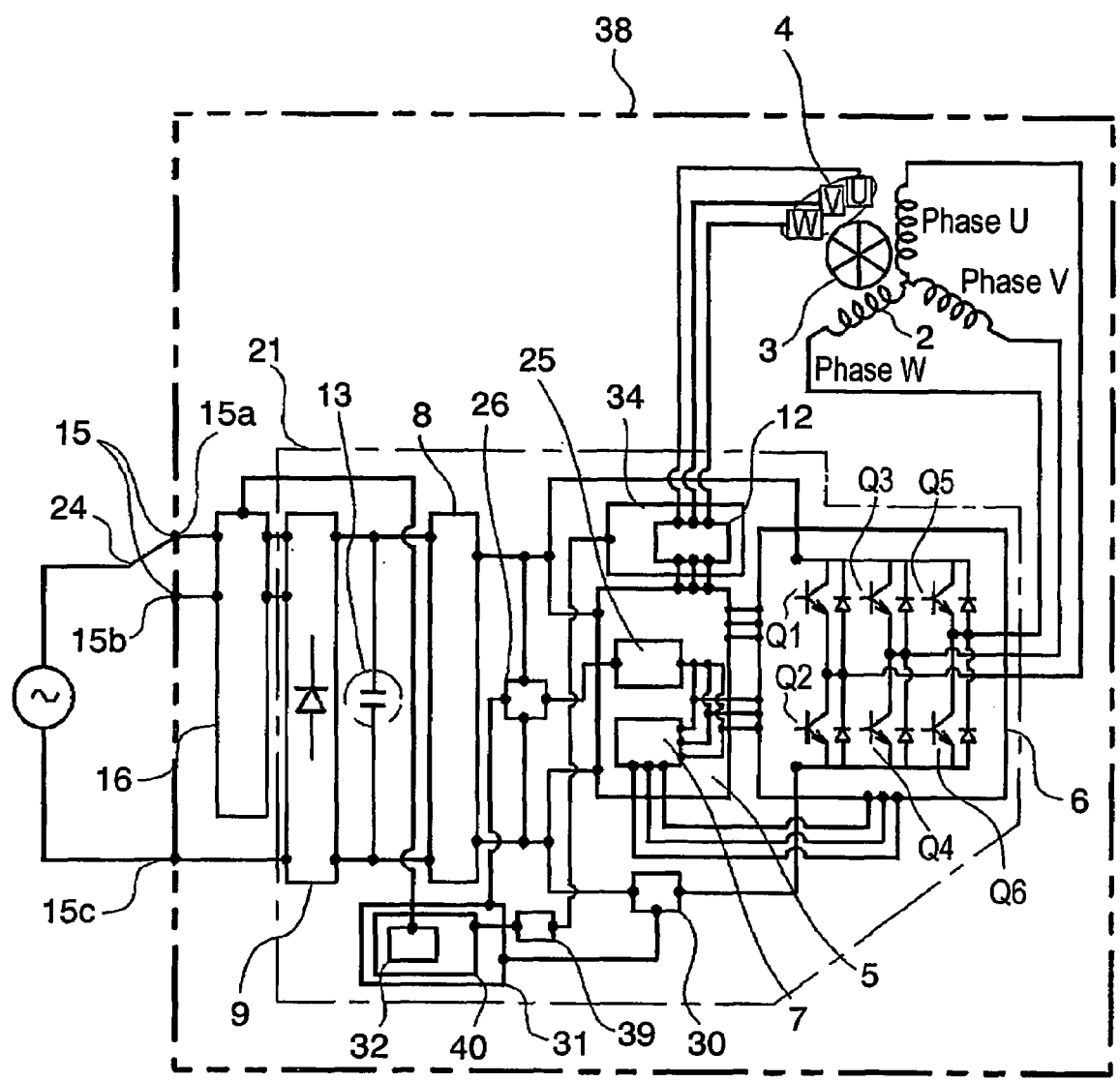
FIG. 16 shows an electric circuit, using the PWM method, of the brushless DC motor shown in FIG. 13.

FIG. 16 tells that the PWM control is applicable to the brushless DC motor of the present embodiment as described in the previous embodiment. Current controller 31 controls duty instruction means 26, thereby adjusting the ON/OFF duty of the PWM such that the average current of inverter circuit 6 becomes equal to the current instructed by current instructing means 33 to change in response to the rpm range of the motor. An upper limit to the current of inverter circuit 6 is needed because of the same reason as described in the previous embodiment.

EXEMPLARY EMBODIMENT 5

Figure 17:
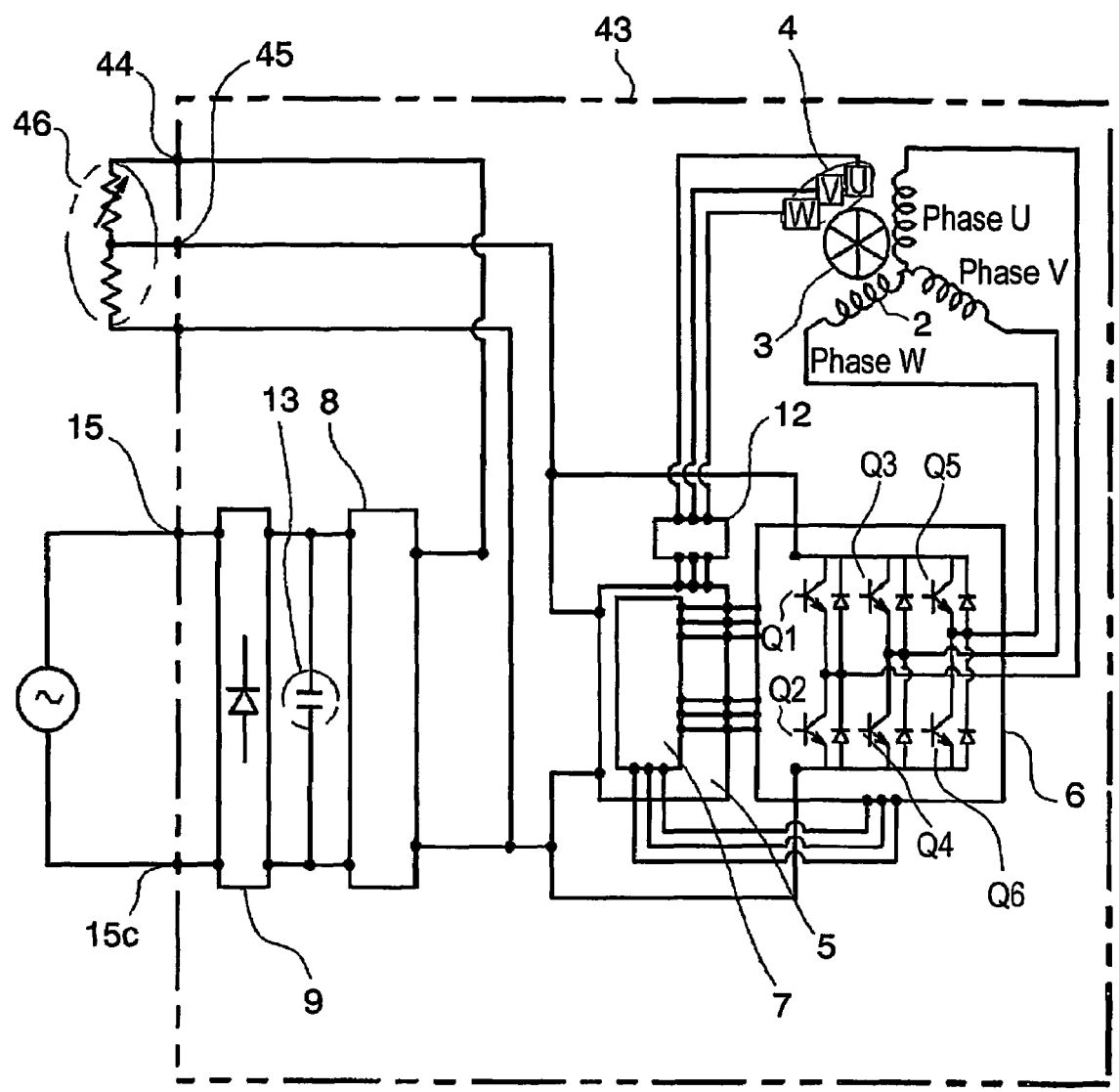
FIG. 17 shows an electric circuit of a brushless DC motor in accordance with a fifth exemplary embodiment of the present invention.

FIG. 17 shows an electric circuit of the brushless DC motor in accordance with the fifth exemplary embodiment of the present invention. Elements similar to those in the previous embodiment have the same reference marks and the descriptions thereof are omitted here.

Voltage reducing means 46 is placed outside the motor via terminals 44 ant 45. The low DC voltage supplied from DC voltage converter 8 is applied to inverter circuit 6 via voltage reducing means 46.

Figure 18:
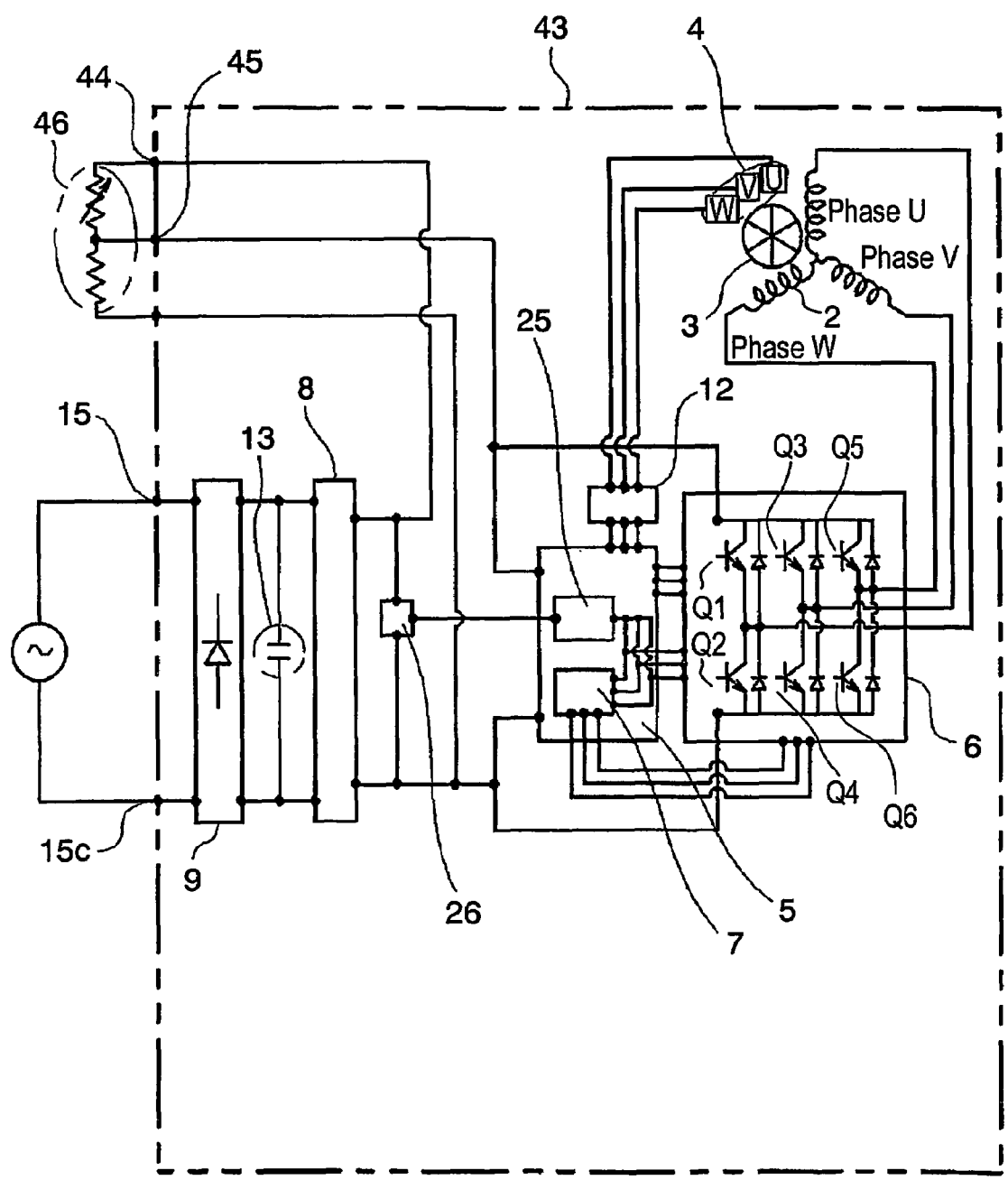
FIG. 18 shows an electric circuit, using the PWM method, of the brushless DC motor shown in FIG. 17.

The foregoing structure allows obtaining a brushless DC motor directly coupled to the AC source, and the motor can be adjusted its speed smoothly, i.e. not the step-like adjustment, so that a ventilator can be set its air volume arbitrarily. FIG. 18 tells that the PWM control is applicable to the brushless DC motor of the present embodiment as discussed in the previous embodiment.

EXEMPLARY EMBODIMENT 6

Figure 19:
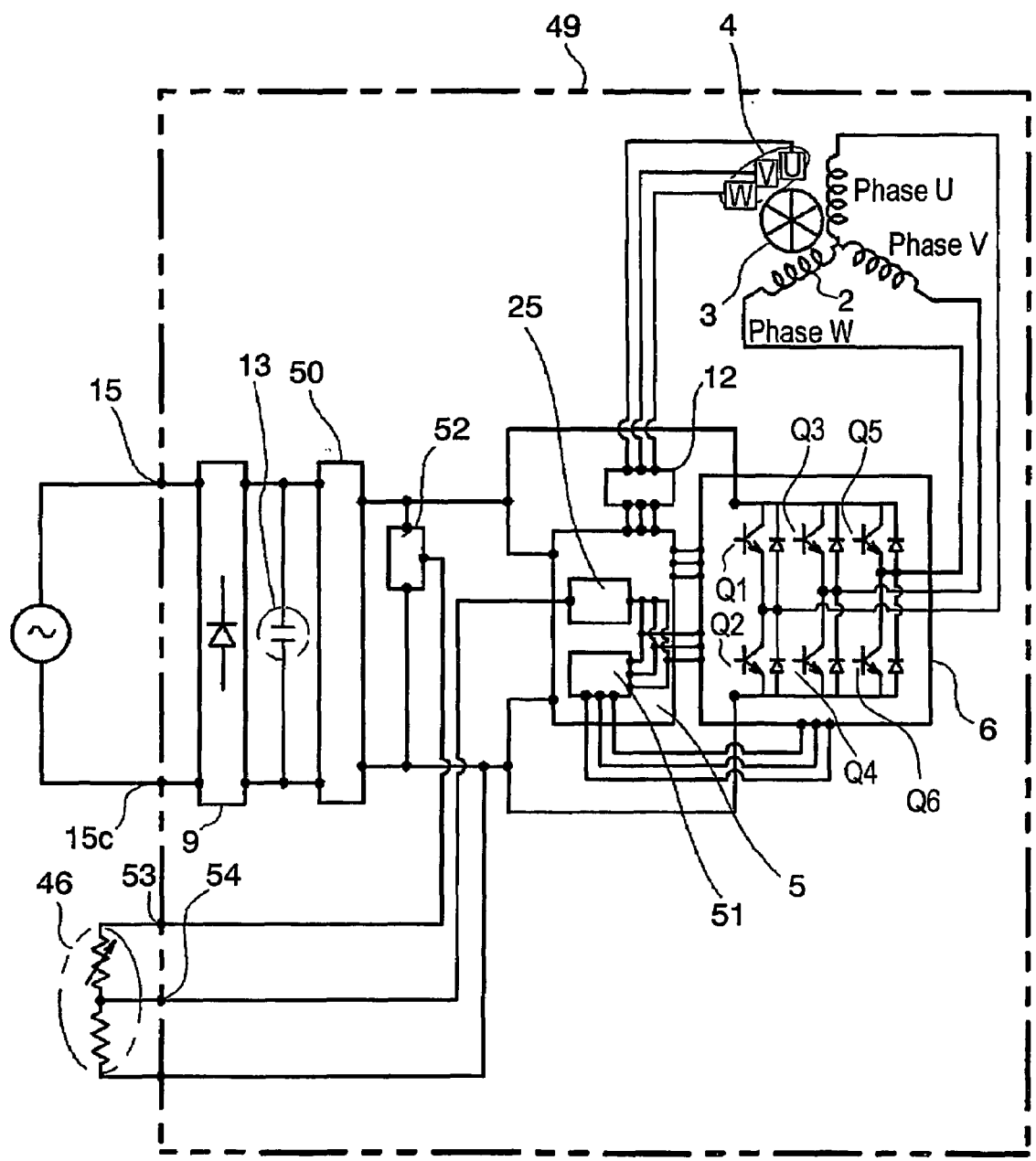
FIG. 19 shows an electric circuit of a brushless DC motor in accordance with a sixth exemplary embodiment of the present invention.

FIG. 19 shows an electric circuit of the brushless DC motor in accordance with the sixth exemplary embodiment of the present invention. Elements similar to those in the previous embodiment have the same reference marks and the descriptions thereof are omitted here.

Voltage reducing means 46 is placed outside the motor via terminals 53 and 54. PWM controller 25 controls switching elements Q2, Q4, and Q6 disposed in the lower arm. Current waveform controller 51 adjusts an ON/OFF duty of the switching elements of the lower arm such that a waveform of the motor current becomes a similar figure to the waveform from which the harmonics have been removed by magnetic flux density synthesizer 12. Reference voltage generating circuit 52 reduces the low DC voltage supplied from a DC voltage converter 50, thereby generating a reference voltage of constant output. The reference voltage is then, via voltage reducing means 46 outside the motor, applied to PWM controller 25 as a duty instruction voltage indicating an ON/OFF duty of the PWM.

The foregoing structure allows obtaining a brushless DC motor directly coupled to the AC source, and the motor can be adjusted its speed smoothly, i.e. not the step-like adjustment, so that the ventilator can be set its air volume arbitrarily.

EXEMPLARY EMBODIMENT 7

Figure 20:
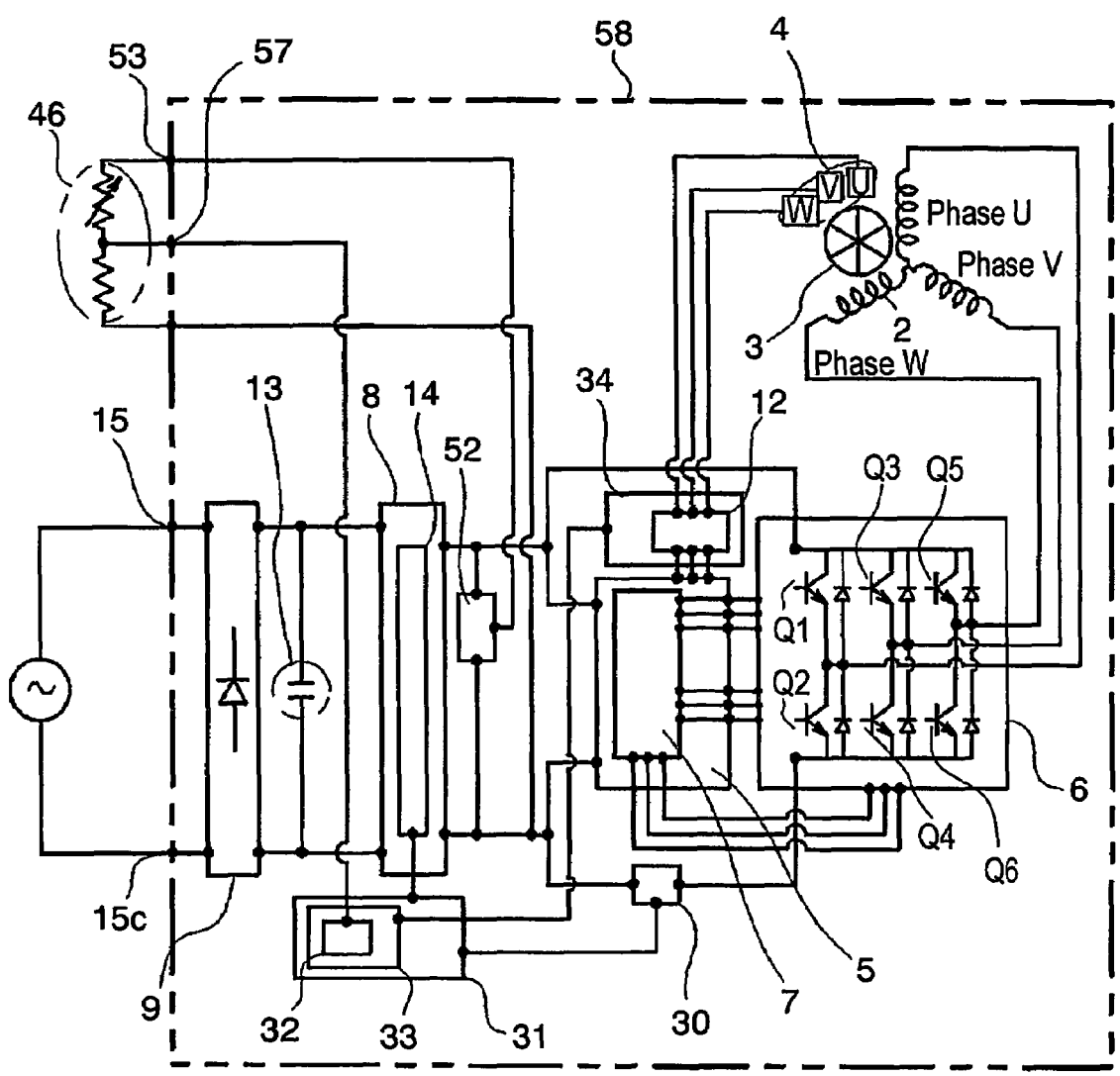
FIG. 20 shows an electric circuit of a brushless DC motor in accordance with a seventh exemplary embodiment of the present invention.

FIG. 20 shows an electric circuit of the brushless DC motor in accordance with the seventh exemplary embodiment. Elements similar to those in the previous embodiment have the same reference marks and the descriptions thereof are omitted here.

Voltage reducing means 46 is placed outside the motor via terminals 53 and 57. Reference voltage generating circuit 52 reduces the low DC voltage supplied from DC voltage converter 8, thereby generating a reference voltage of constant output. The reference voltage is then, via voltage reducing means 46 outside the motor, applied to set current changer 32.

Set current changer 32 changes the reference value depending on a voltage applied. Current instructing means 33 instructs inverter circuit 6 in response to an output signal supplied from rotary signal output means 34 to run a constant current, or change the current with respect to the reference value, or change the current stepwise with respect to the reference value. At this time, an upper limit voltage is set to the low DC voltage to be applied to inverter circuit 6 because a withstanding voltage and a kick-back voltage of the switching elements should be taken into consideration. As a result, within a certain period, the motor can operate at a constant voltage without controlling the current even if the rpm rises.

Figure 21:
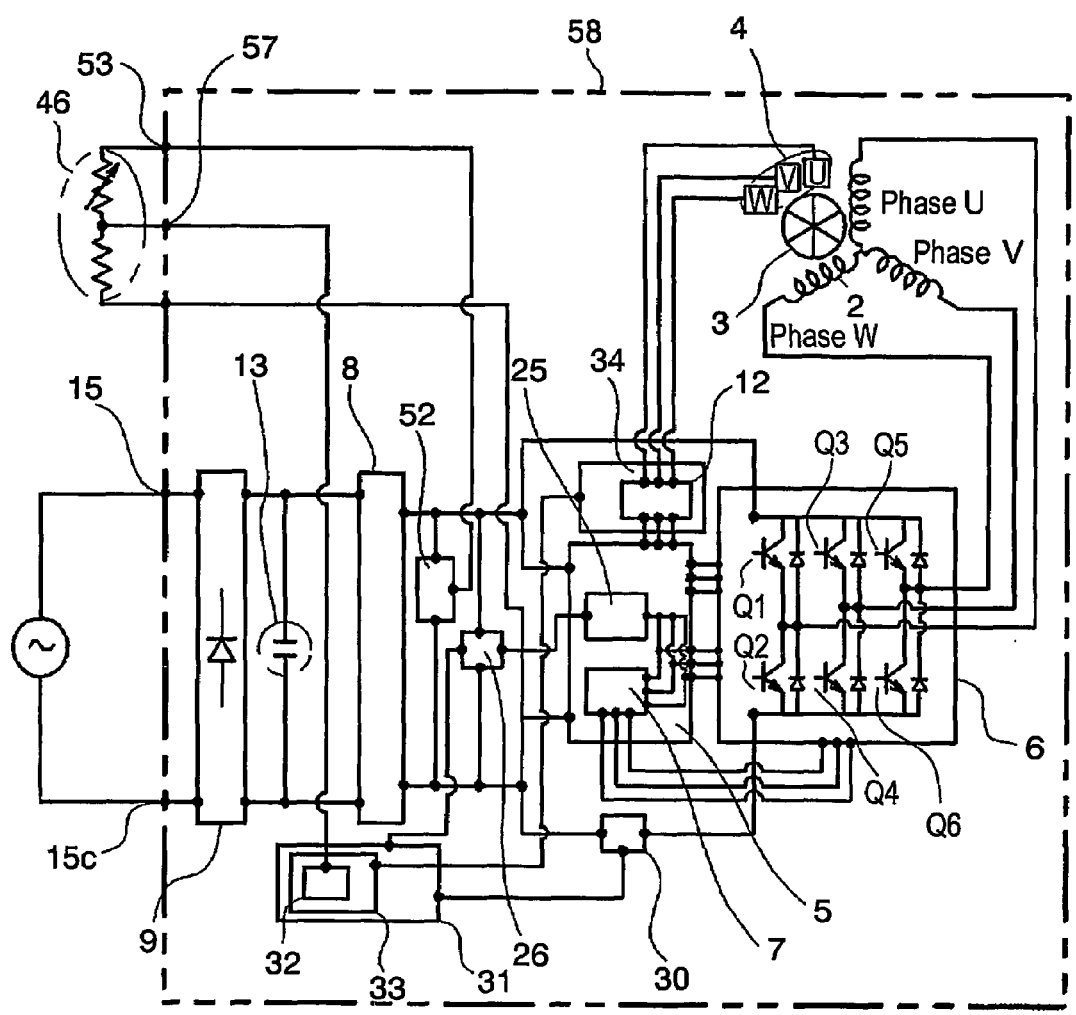
FIG. 21 shows an electric circuit, using the PWM method, of the brushless DC motor shown in FIG. 20.

In this embodiment, the current of inverter circuit 6 increases at a greater rpm, and on the contrary, decreases at a smaller rpm. As a result, the shaft torque of the motor increases at the greater rpm. The ventilator employing the brushless DC motor of this embodiment obtains the characteristics of air volume changes only extremely few even if a pressure loss changes by the outer wind pressure or by the difference of the duct length. FIG. 21 tells that the PWM control is applicable to the brushless DC motor of this embodiment as discussed in the previous embodiment.

Figure 22:
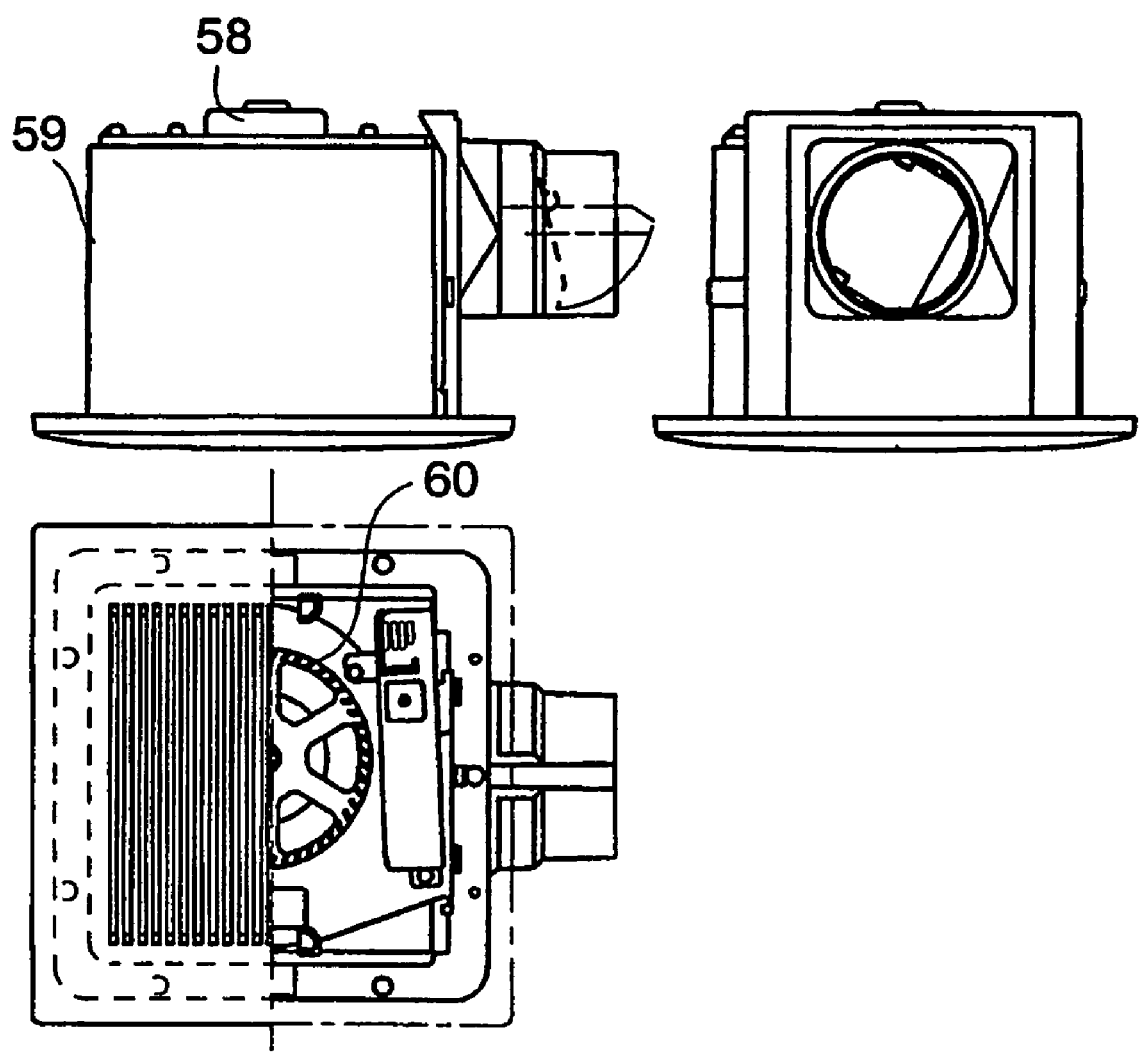
FIG. 22 shows a lateral view, front view, and plan view of a ventilator using the brushless DC motor of the present invention.
Figure 23:
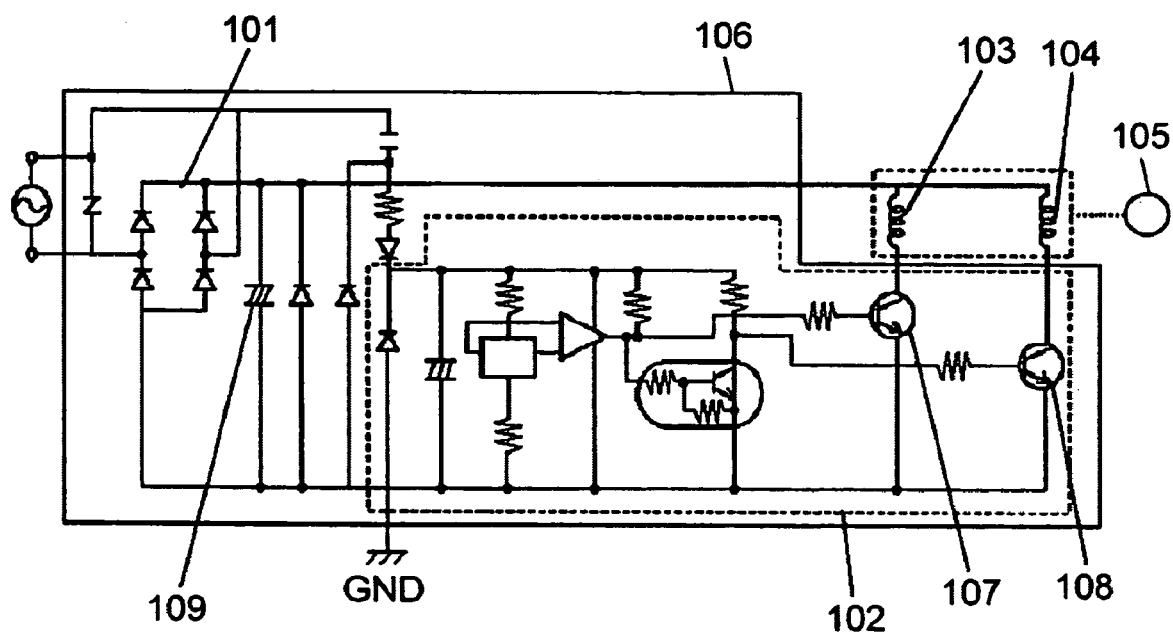
FIG. 23 shows an electric circuit of a conventional brushless DC motor.

An electric apparatus employing the brushless DC motor of the present invention is demonstrated hereinafter. The brushless DC motor is suitable for electric apparatuses such as a ventilator and a blower. FIG. 22 shows a front view, side view, and plan view of the ventilator employing the brushless DC motor of the present invention.

In FIG. 22, ventilator 59 includes brushless DC motor 58 and centrifugal blower 60, where motor 58 rotates a sirocco fan of blower 60 for blowing. The motors discussed in the previous embodiments can be used as motor 58, so that the ventilator of the present invention enjoys the advantages of the motors.

The brushless DC motor directly coupled to the AC source of the present invention allows reducing torque ripples and reducing change rate of momentary torque, thereby suppressing noises and vibrations. This motor has the following advantages: a small current; a wide range of load torque available; low power consumption at a high power output range; a downsized circuit; high quality; a long service life; suppressing uneven rotation; no changes in the characteristics upon a change in power supply voltage; and equivalent rpm vs. torque characteristics to those of the induction motor. Further, this motor allows reducing the number of steps of adjusting its specifications, so that it is useful to mount this motor in electric apparatuses incorporating an centrifugal blower, such as a ventilator, water heater, air conditioner, air cleaner, dehumidifier, dryer, and fan-filter unit. Still further, since this motor has the characteristics of rpm vs. torque, such that the shaft torque increases at a greater rpm, it is useful to mount this motor to the following electric apparatuses which incorporate the centrifugal blower and require the characteristics of air volume vs. static pressure, where almost no changes in air volume occur upon a change in static pressure: a ventilator, water heater, air cleaner, air-conditioner, and a blower unit for a clean-room.

INDUSTRIAL APPLICABILITY

The brushless DC motor of the present invention is suitable for being mounted in a ventilator and a blower.

The invention claimed is:

1. A brushless DC motor coupled directly to an AC source, the motor comprising:
   (a) a stator including a stator coil;
   (b) a rotor including a rotor magnet;
   (c) a magnetic flux sensor for sensing magnetic-flux of the rotor magnet;
   (d) an inverter circuit including a plurality of switching elements coupled in a full-wave bridge having an upper arm and a lower arm;
   (e) a plurality of AC source couplers;
   (f) a rectifier for full-wave rectifying a voltage of the AC source;
   (g) a DC voltage converter for converting a rectified voltage supplied from the rectifier into a low DC voltage, and for applying the low DC voltage to the inverter circuit as a power supply;
   (h) a controller for controlling the inverter circuit based on a signal supplied from the magnetic flux sensor such that the low DC voltage is supplied to the stator coil in a full-wave driving method; and
      (i) a current controller for regulating an average current value applied to the inverter circuit constantly at a set current;
         (j) a set current changer for changing the set current regulated by the current controller;
   wherein the set current changer changes the set current regulated by the current controller in response to which terminals of the AC source couplers are coupled to the AC source.

2. The brushless DC motor of claim 1 further comprising:
   a current instructing means for instructing an average current value to the inverter circuit; and
      a terminal for connecting a voltage reducing means disposed outside the motor,
         wherein a signal voltage which instructs the average current value to the inverter circuit is applied to the current instructing means via the voltage reducing means disposed outside the motor and
         wherein the signal voltage instructs the inverter circuit to run a constant current.

3. An electric apparatus in which the brushless DC motor as defined in claim 1 is mounted.

4. A brushless DC motor coupled directly to an AC source, the motor comprising:
   (a) a stator including a stator coil;
   (b) a rotor including a rotor magnet;
   (c) a magnetic flux sensor for sensing magnetic-flux of the rotor magnet;
   (d) an inverter circuit including a plurality of switching elements coupled in a full-wave bridge having an upper arm and a lower arm;
   (e) an AC source coupler;
   (f) a rectifier for full-wave rectifying a voltage of the AC source;
   (g) a DC voltage converter for converting a rectified voltage supplied from the rectifier into a low DC voltage, and for applying the low DC voltage to the inverter circuit as a power supply;
   (h) a controller for controlling the inverter circuit based on a signal supplied from the magnetic flux sensor such that the low DC voltage is supplied to the stator coil in a full-wave driving method;
      (i) a current instructing means for instructing the average current value for supplying to the inverter circuit;
      (j) a current controller for regulating the average current value supplied to the inverter circuit constantly at a instructed value; and
      (k) an output means for outputting a signal of a motor rpm based on a signal supplied from the magnetic flux sensor;
   wherein the current instructing means instructs the average current value for supplying to the inverter circuit in response to the motor rpm.

5. The brushless DC motor of claim 4, wherein the AC source coupler includes a plurality of terminals,
   wherein the current instructing means changes an instruction of the average current value in response to the motor rpm depending on which terminals of the AC source coupler are coupled to the AC source.

6. The brushless DC motor of claim 4, further comprising:
   a detecting means for detecting a rpm range of the motor within which the motor rpm is included,
   wherein the current instructing means instructs the average current value for supplying to the inverter circuit in response to the rpm range of the motor.

7. The brushless DC motor of claim 6 further comprising:
   a terminal for connecting a voltage reducing means disposed outside the motor,
      wherein a signal voltage which instructs the average current value to the inverter circuit is applied to the current instructing means via the voltage reducing means disposed outside the motor and
      wherein the signal voltage instructs the inverter circuit to change a current in response to the rpm range of the motor.

8. The brushless DC motor of claim 4 further comprising:
   a terminal for connecting a voltage reducing means disposed outside the motor,
      wherein a signal voltage which instructs the average current value to the inverter circuit is applied to the current instructing means via the voltage reducing means disposed outside the motor and
      wherein the signal voltage instructs the inverter circuit to change a current in response to the motor rpm.

9. An electric apparatus in which the brushless DC motor as defined in claim 4 is mounted.

* * * * *